(12) United States Patent
Bleyer et al.

(10) Patent No.: US 11,972,549 B2
(45) Date of Patent: Apr. 30, 2024

(54) FRAME SELECTION FOR IMAGE MATCHING IN RAPID TARGET ACQUISITION

(71) Applicant: Microsoft Technology Licensing, LLC, Redmond, WA (US)

(72) Inventors: Michael Bleyer, Seattle, WA (US); Raymond Kirk Price, Redmond, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 380 days.

(21) Appl. No.: 17/500,145

(22) Filed: Oct. 13, 2021

(65) Prior Publication Data

US 2023/0112148 A1    Apr. 13, 2023

(51) Int. Cl.
| | |
|---|---|
| *G06K 9/00* | (2022.01) |
| *G02B 27/01* | (2006.01) |
| *G06T 7/00* | (2017.01) |
| *G06T 19/00* | (2011.01) |

(52) U.S. Cl.
CPC ........ *G06T 7/0002* (2013.01); *G02B 27/0172* (2013.01); *G06T 7/97* (2017.01); *G06T 19/006* (2013.01); *G02B 2027/0138* (2013.01); *G02B 2027/014* (2013.01); *G06T 2207/30168* (2013.01)

(58) Field of Classification Search
CPC .................................................. G02B 27/017
See application file for complete search history.

(56) References Cited

U.S. PATENT DOCUMENTS

| | | | |
|---|---|---|---|
| 2015/0172542 A1 | 6/2015 | Juhola et al. | |
| 2018/0070015 A1 | 3/2018 | Hubel et al. | |
| 2018/0146189 A1* | 5/2018 | Park | H04N 13/344 |
| 2021/0082143 A1* | 3/2021 | Lee | G06T 7/73 |
| 2021/0125314 A1* | 4/2021 | Jones | G06T 15/04 |
| 2021/0160440 A1 | 5/2021 | Bleyer et al. | |
| 2021/0195087 A1 | 6/2021 | Peng et al. | |
| 2022/0171187 A1* | 6/2022 | Bleyer | G02B 27/0172 |
| 2023/0115537 A1* | 4/2023 | Price | G06T 7/174 |
| | | | 382/276 |

OTHER PUBLICATIONS

"International Search Report and Written Opinion Issued in PCT Application No. PCT/US22/039354", dated Oct. 26, 2022, 12 Pages.
Yelton, et al., "Processing System for an Enhanced Vision System", In Proceedings of SPIE, vol. 5424, Aug. 11, 2004, pp. 163-176.

* cited by examiner

*Primary Examiner* — Hadi Akhavannik
(74) *Attorney, Agent, or Firm* — Workman Nydegger

(57) ABSTRACT

Techniques for evaluating multiple images, which originate from multiple different sources, and for selecting specific images to generate an overlaid image are disclosed. A first set of system camera images (e.g., based on a first FPS rate) and a second set of external camera images (e.g., based on a second FPS rate) are obtained. A set of rules are accessed in order to govern a selection process for selecting a specific system camera image and a specific external camera image. The selected images are designated for use in generating an overlaid image. The selection process is performed using the accessed set of rules. The overlaid image is generated by overlaying and aligning content obtained from the selected images.

20 Claims, 16 Drawing Sheets

FRAME SELECTION FOR IMAGE MATCHING IN RAPID TARGET ACQUISITION

BACKGROUND

Mixed-reality (MR) systems, which include virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

A MR system may also employ different types of cameras in order to display content to users, such as in the form of a passthrough image. A passthrough image or view can aid users in avoiding disorientation and/or safety hazards when transitioning into and/or navigating within a MR environment. A MR system can present views captured by cameras in a variety of ways. The process of using images captured by world-facing cameras to provide views of a real-world environment creates many challenges, however.

Some of these challenges occur when attempting to align image content from multiple cameras, such as an integrated "system camera" and a detached "external camera" when generating the passthrough image. Challenges also occur when additional visualizations are provided in the resulting overlaid passthrough image, where these visualizations are designed to indicate a spatial relationship between the system camera and the external camera. The time taken to i) generate a system camera image and an external camera image, ii) overlay and align the content, and then iii) display the resulting overlaid passthrough image with additional visualizations is not instantaneous. Because of that, movement of the system camera and/or the external camera may occur between the time when the images are generated and when the final passthrough image is displayed. Such movement results in a visible latency or lagging effect and is disruptive to the user. Additionally, traditional techniques often relied on inadequate images when attempting to perform the alignment operations. Because of these inadequate images, the alignment process would often fail, and other techniques would need to be performed to provide the overlaid image. Accordingly, aligning image content provides substantial benefits, especially in terms of hologram placement and generation, so these problems present serious obstacles to the technical field. As such, there is a substantial need in the field to improve how images are aligned with one another.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The embodiments disclosed herein relate to systems, devices (e.g., wearable devices, hardware storage devices, etc.), and methods for evaluating multiple images, which originate from multiple different sources, and for selecting specific images in order to generate an overlaid image.

Some embodiments obtain a first set of system camera images from a system camera that is operating at a first frame per second (FPS) rate. The embodiments also obtain a second set of external camera images from an external camera that is detached from the system camera. The external camera operates at a second FPS rate that is different from the first FPS rate. The embodiments access a set of rules that govern a selection process for selecting (e.g., from among the first set of system camera images) a specific system camera image and for selecting (e.g., from among the second set of external camera images) a specific external camera image. The selected specific system camera image and the specific external camera image are designated for use in generating an overlaid image. The selection process is then performed using the accessed set of rules. Notably, performance of the selection process results in the specific system camera image and the specific external camera image being selected. The embodiments then generate the overlaid image by overlaying and aligning content obtained from the selected external camera image onto the selected system camera image. Optionally, the overlaid image can be displayed in a head mounted device (HMD).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
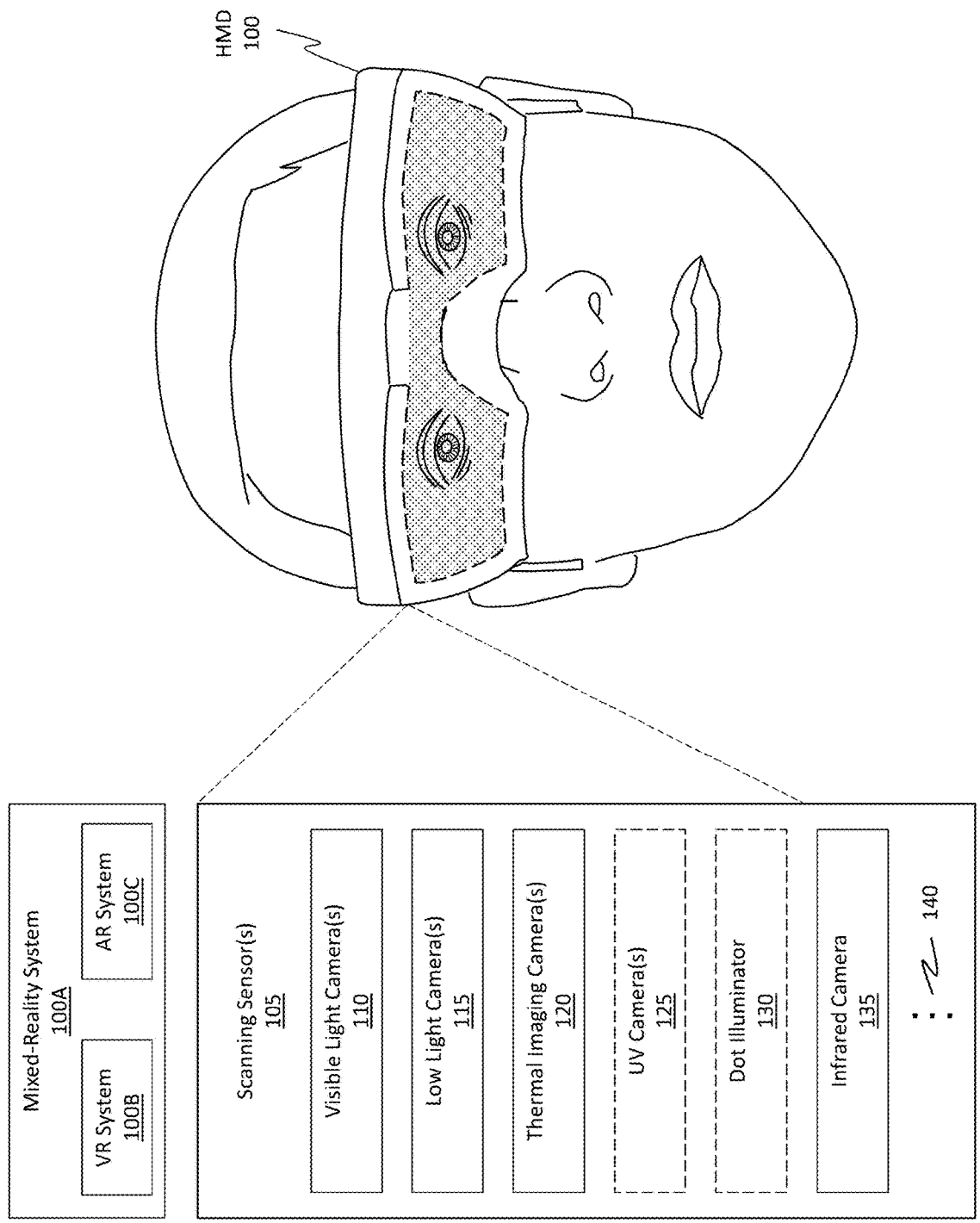
FIG. 1 illustrates an example head mounted device (HMD) configured to perform the disclosed operations.

The embodiments disclosed herein relate to systems, devices (e.g., wearable devices, hardware storage devices, etc.), and methods for evaluating multiple images, which originate from multiple different sources, and for selecting specific images in order to generate an overlaid image.

Some embodiments obtain a first set of system camera images (e.g., based on a first FPS rate) and a second set of external camera images (e.g., based on a second FPS rate). A set of rules are accessed in order to govern a selection process for selecting a specific system camera image and a specific external camera image. The selected images are designated for use in generating an overlaid image. The selection process is performed using the accessed set of rules. The embodiments then generate the overlaid image by overlaying and aligning content obtained from the selected images. Optionally, the overlaid image can be displayed in a head mounted device (HMD).

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

As described earlier, challenges occur when aligning image content from two different cameras. Generally, there are a few techniques that can be used to align images. One technique is referred to herein as a "visual alignment" technique. This technique involves identifying feature points in one image and corresponding feature points in another image. The technique then involves aligning the images using the common feature points as references. Another technique involves the use of IMU data to track and monitor how one camera shifts in pose and orientation relative to another camera (i.e. an "IMU-based" approach). The orientation models for the cameras can be modified based on the IMU data, and the resulting images can be reprojected in order to align with one another.

It is typically the case that IMU data is readily available, so performing the IMU-based correction is usually an option, but it is often less accurate than the visual alignment technique. The visual alignment technique, on the other hand, might not always be available. For instance, it is sometimes the case that a sufficient number of feature points are not detectable or that the lighting conditions are not adequate. What results then is a hybrid approach in which IMU data is relied on to perform the alignment when the visual alignment process is not available.

Differences exist in the timing as to when the system camera generates images, when the external camera generates images, and even when the visual alignment process is performed. For example, it is often the case that the system camera operates at a frame per second (FPS) rate of at least 60 FPS, and it is often the case that the external camera operates at a FPS rate of at least 30 FPS. The visual alignment process, on the other hand, is often triggered or executed at about 3 Hz. What this means, then, is that both the system camera and the external camera generate multiple images during the interim while the visual alignment process is not performed. Interestingly, traditional systems were configured to consider only the last or most recent image when performing the visual alignment process. Sometimes, the quality of that most recent image was not satisfactory (e.g., failed to satisfy a quality threshold), thereby causing the visual alignment process to also fail. This failure increased the reliance on the IMU-based process, which is less accurate than the visual alignment process, thereby compounding inaccuracies in the system. Furthermore, failure can also mean that a visual alignment has not been found. In some cases, failure can also mean that an alignment has been found, but this alignment is wrong. This scenario (i.e. a wrong alignment) is more severe as it results in wrong overlays. It may take multiple correct visual alignments to recover from such a failure.

The disclosed embodiments provide solutions to these problems by capitalizing on the availability of numerous different system camera images and external camera images. That is, as described previously, the FPS rates of the system camera and the external camera are significantly higher than the operating rate of the visual alignment process. In accordance with the disclosed principles, the embodiments are able to not only consider the most recent image but also consider all of the images that have been generated since the last visual alignment process or images that have been generated over a pre-defined amount of time (e.g., sets of images can be overlapping in duration). During this consideration phase, the embodiments can select an image having the best likelihood to enable a successful visual alignment process. Notably, the selection process is based on a defined set of rules that govern which images will be selected to generate the overlaid image during the visual alignment process.

As a result of performing these operations, the user's experience is significantly improved, thereby leading to an improvement in the technology. Improved image alignment and visualization are also achieved. Accordingly, these and numerous other benefits will be described throughout the remaining portions of this disclosure.

Example MR Systems and HMDs

Attention will now be directed to FIG. 1, which illustrates an example of a head mounted device (HMD) 100. HMD 100 can be any type of MR system 100A, including a VR system 100B or an AR system 100C. It should be noted that while a substantial portion of this disclosure is focused on the use of an HMD, the embodiments are not limited to being practiced using only an HMD. That is, any type of camera system can be used, even camera systems entirely removed or separate from an HMD. As such, the disclosed principles should be interpreted broadly to encompass any type of camera use scenario. Some embodiments may even refrain from actively using a camera themselves and may simply use the data generated by a camera. For instance, some embodiments may at least be partially practiced in a cloud computing environment.

HMD 100 is shown as including scanning sensor(s) 105 (i.e. a type of scanning or camera system), and HMD 100 can use the scanning sensor(s) 105 to scan environments, map environments, capture environmental data, and/or generate any kind of images of the environment (e.g., by generating a 3D representation of the environment or by generating a "passthrough" visualization). Scanning sensor(s) 105 may comprise any number or any type of scanning devices, without limit.

In accordance with the disclosed embodiments, the HMD 100 may be used to generate a passthrough visualizations of the user's environment. As used herein, a "passthrough" visualization refers to a visualization that reflects the perspective of the environment from the user's point of view. To generate this passthrough visualization, the HMD 100 may use its scanning sensor(s) 105 to scan, map, or otherwise record its surrounding environment, including any objects in the environment, and to pass that data on to the user to view. As will be described shortly, various transformations may be applied to the images prior to displaying them to the user to ensure the displayed perspective matches the user's expected perspective.

To generate a passthrough image, the scanning sensor(s) 105 typically rely on its cameras (e.g., head tracking cameras, hand tracking cameras, depth cameras, or any other type of camera) to obtain one or more raw images (aka "texture images") of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images (e.g., based on pixel disparities), and passthrough images can be generated (e.g., one for each pupil) using the depth map for any reprojections, if needed.

From the passthrough visualizations, a user will be able to perceive what is currently in his/her environment without having to remove or reposition the HMD 100. Furthermore, as will be described in more detail later, the disclosed passthrough visualizations can also enhance the user's ability to view objects within his/her environment (e.g., by displaying additional environmental conditions that may not have been detectable by a human eye). As used herein, a so-called "overlaid image" can be a type of passthrough image.

It should be noted that while the majority of this disclosure focuses on generating "a" passthrough image, the embodiments actually generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 105 include visible light camera(s) 110, low light camera(s) 115, thermal imaging camera(s) 120, potentially (though not necessarily, as represented by the dotted box in FIG. 1) ultraviolet (UV) camera(s) 125, potentially (though not necessarily, as represented by the dotted box) a dot illuminator 130, and even an infrared camera 135. The ellipsis 140 demonstrates how any other type of camera or camera system (e.g., depth cameras, time of flight cameras, virtual cameras, depth lasers, etc.) may be included among the scanning sensor(s) 105.

As an example, a camera structured to detect mid-infrared wavelengths may be included within the scanning sensor(s) 105. As another example, any number of virtual cameras that are reprojected from an actual camera may be included among the scanning sensor(s) 105 and may be used to generate a stereo pair of images. In this manner, the scanning sensor(s) 105 may be used to generate the stereo pair of images. In some cases, the stereo pair of images may be obtained or generated as a result of performing any one or more of the following operations: active stereo image generation via use of two cameras and one dot illuminator (e.g., dot illuminator 130); passive stereo image generation via use of two cameras; image generation using structured light via use of one actual camera, one virtual camera, and one dot illuminator (e.g., dot illuminator 130); or image generation using a time of flight (TOF) sensor in which a baseline is present between a depth laser and a corresponding camera and in which a field of view (FOV) of the corresponding camera is offset relative to a field of illumination of the depth laser.

The visible light camera(s) 110 are typically stereoscopic cameras, meaning that the fields of view of the two or more visible light cameras at least partially overlap with one another. With this overlapping region, images generated by the visible light camera(s) 110 can be used to identify disparities between certain pixels that commonly represent an object captured by both images. Based on these pixel disparities, the embodiments are able to determine depths for objects located within the overlapping region (i.e. "stereoscopic depth matching" or "stereo depth matching"). As such, the visible light camera(s) 110 can be used to not only generate passthrough visualizations, but they can also be used to determine object depth. In some embodiments, the visible light camera(s) 110 can capture both visible light and IR light.

It should be noted that any number of cameras may be provided on the HMD 100 for each of the different camera types (aka modalities). That is, the visible light camera(s) 110 may include 1, 2, 3, 4, 5, 6, 7, 8, 9, 10, or more than 10 cameras. Often, however, the number of cameras is at least 2 so the HMD 100 can perform passthrough image generation and/or stereoscopic depth matching, as described earlier. Similarly, the low light camera(s) 115, the thermal imaging camera(s) 120, and the UV camera(s) 125 may each respectively include 1, 2, 3, 4, 5, 6, 7, 8, 9, 10, or more than 10 corresponding cameras.

Figure 2:
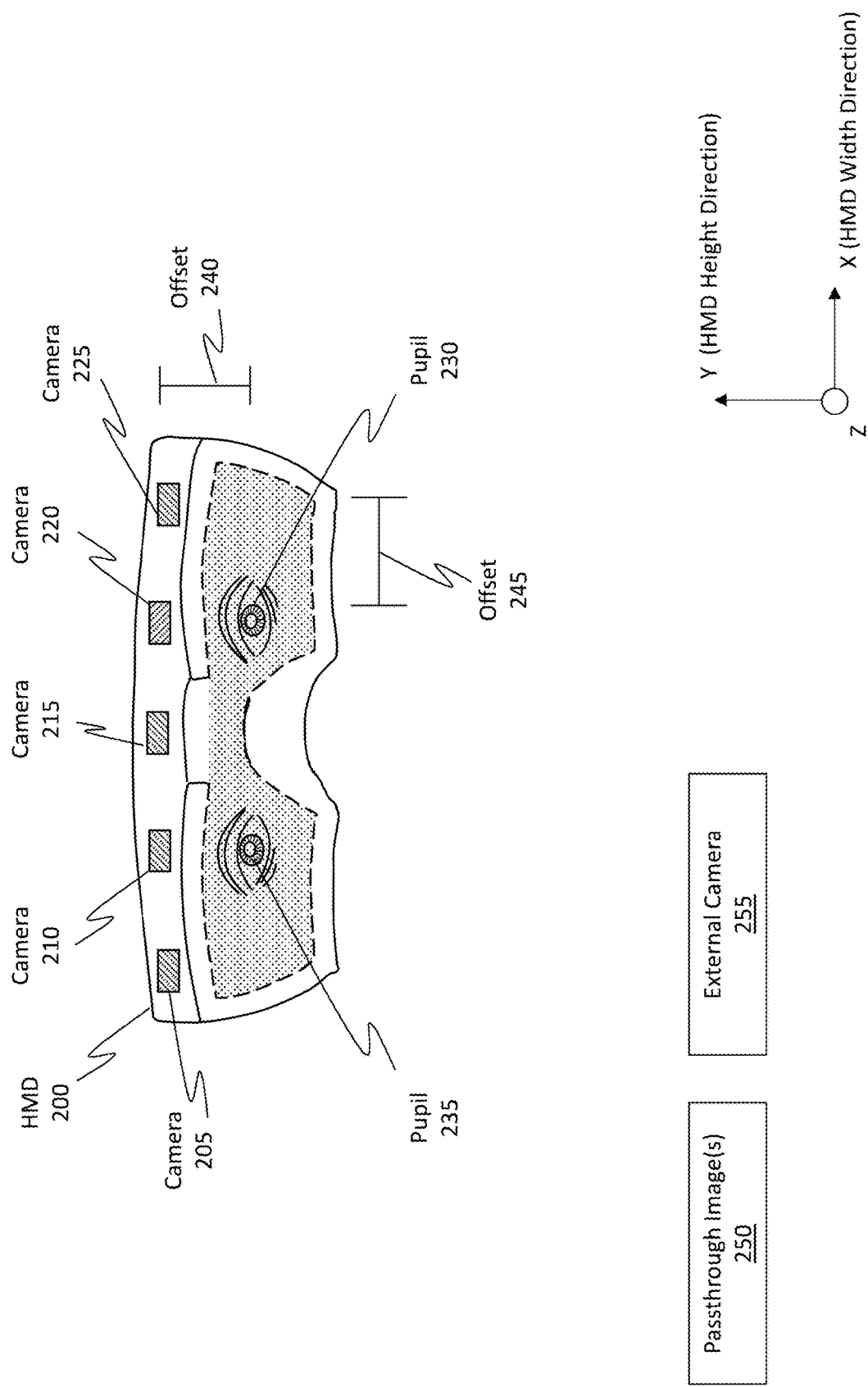
FIG. 2 illustrates another configuration of an HMD.

FIG. 2 illustrates an example HMD 200, which is representative of the HMD 100 from FIG. 1. HMD 200 is shown as including multiple different cameras, including cameras 205, 210, 215, 220, and 225. Cameras 205-225 are representative of any number or combination of the visible light camera(s) 110, the low light camera(s) 115, the thermal imaging camera(s) 120, and the UV camera(s) 125 from FIG. 1. While only 5 cameras are illustrated in FIG. 2, HMD 200 may include more or less than 5 cameras. Any one of those cameras can be referred to as a "system camera."

In some cases, the cameras can be located at specific positions on the HMD 200. In some cases, a first camera (e.g., perhaps camera 220) is disposed on the HMD 200 at a position above a designated left eye position of a user who wears the HMD 200 relative to a height direction of the HMD. For example, the camera 220 is positioned above the pupil 230. As another example, the first camera (e.g., camera 220) is additionally positioned above the designated left eye position relative to a width direction of the HMD. That is, the camera 220 is positioned not only above the pupil 230 but also in-line relative to the pupil 230. When a VR system is used, a camera may be placed directly in front of the designated left eye position. With reference to FIG. 2, a camera may be physically disposed on the HMD 200 at a position in front of the pupil 230 in the z-axis direction.

When a second camera is provided (e.g., perhaps camera 210), the second camera may be disposed on the HMD 200 at a position above a designated right eye position of a user who wears the HMD relative to the height direction of the HMD. For example, the camera 210 is above the pupil 235. In some cases, the second camera is additionally positioned above the designated right eye position relative to the width direction of the HMD. When a VR system is used, a camera may be placed directly in front of the designated right eye position. With reference to FIG. 2, a camera may be physically disposed on the HMD 200 at a position in front of the pupil 235 in the z-axis direction.

When a user wears HMD 200, HMD 200 fits over the user's head and the HMD 200's display is positioned in front of the user's pupils, such as pupil 230 and pupil 235. Often, the cameras 205-225 will be physically offset some distance from the user's pupils 230 and 235. For instance, there may be a vertical offset in the HMD height direction (i.e. the "Y" axis), as shown by offset 240. Similarly, there may be a horizontal offset in the HMD width direction (i.e. the "X" axis), as shown by offset 245.

HMD 200 is configured to provide passthrough image(s) 250 for the user of HMD 200 to view. In doing so, HMD 200 is able to provide a visualization of the real world without requiring the user to remove or reposition HMD 200. These passthrough image(s) 250 effectively represent the view of the environment from the HMD's perspective. Cameras 205-225 are used to provide these passthrough image(s) 250. The offset (e.g., offset 240 and 245) between the cameras and the user's pupils results in parallax. In order to provide these passthrough image(s) 250, the embodiments can perform parallax correction by applying various transformations and reprojections on the images in order to change the initial perspective represented by an image into a perspective matches that of the user's pupils. Parallax correction relies on the use of a depth map in order to make the reprojections.

In some implementations, the embodiments utilize a planar reprojection process to correct parallax when generating the passthrough images as opposed to performing a full three-dimensional reprojection. Using this planar reprojection process is acceptable when objects in the environment are sufficiently far away from the HMD. Thus, in some cases, the embodiments are able to refrain from performing three-dimensional parallax correction because the objects in the environment are sufficiently far away and because that distance results in a negligible error with regard to depth visualizations or parallax issues.

Any of the cameras 205-225 constitute what is referred to as a "system camera" because they are integrated parts of the HMD 200. In contrast, the external camera 255 is physically separate and detached from the HMD 200 but can communicate wirelessly with the HMD 200. As will be described shortly, it is desirable to align images (or image content) generated by the external camera 255 with images (or image content) generated by a system camera to then generate an overlaid image, which can operate as a passthrough image. Often, the angular resolution of the external camera 255 is higher (i.e. more pixels per degree and not just more pixels) than the angular resolution of the system camera, so the resulting overlaid image provides enhanced image content beyond that which is available from using only the system camera image. Additionally, or alternatively, the modalities of the external camera 255 and the system camera may be different, so the resulting overlaid image can also include enhanced information. As an example, suppose the external camera 255 is a thermal imaging camera. The resulting overlaid image can, therefore, include visible light image content and thermal image content. Accordingly, providing an overlaid passthrough image is highly desirable. It should be noted that the external camera 255 may be any of the camera types listed earlier. Additionally, there may be any number of external cameras, without limit.

Example Scenarios

Figure 3:
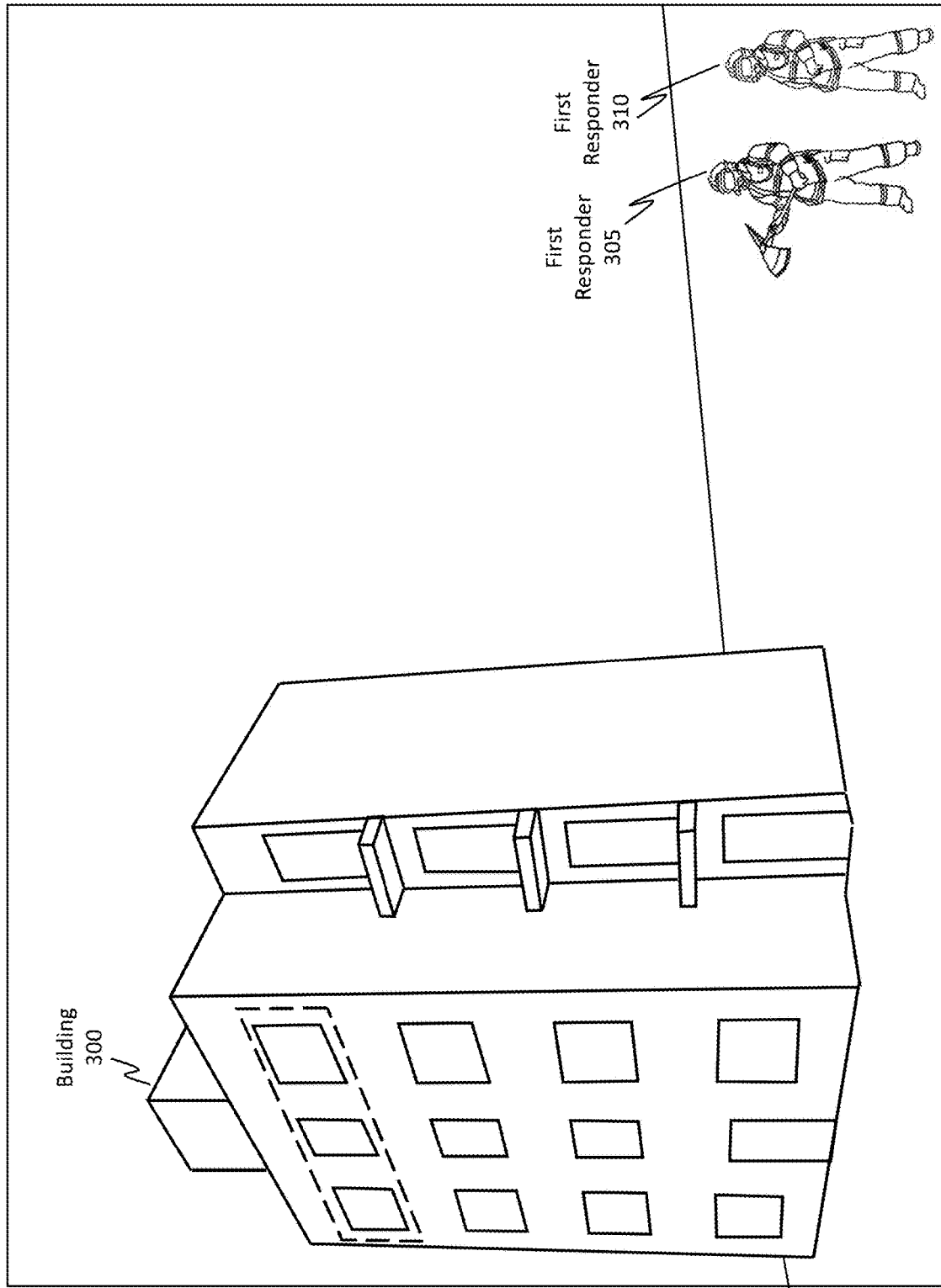
FIG. 3 illustrates an example scenario in which the disclosed principles may be practiced.
Figure 4:
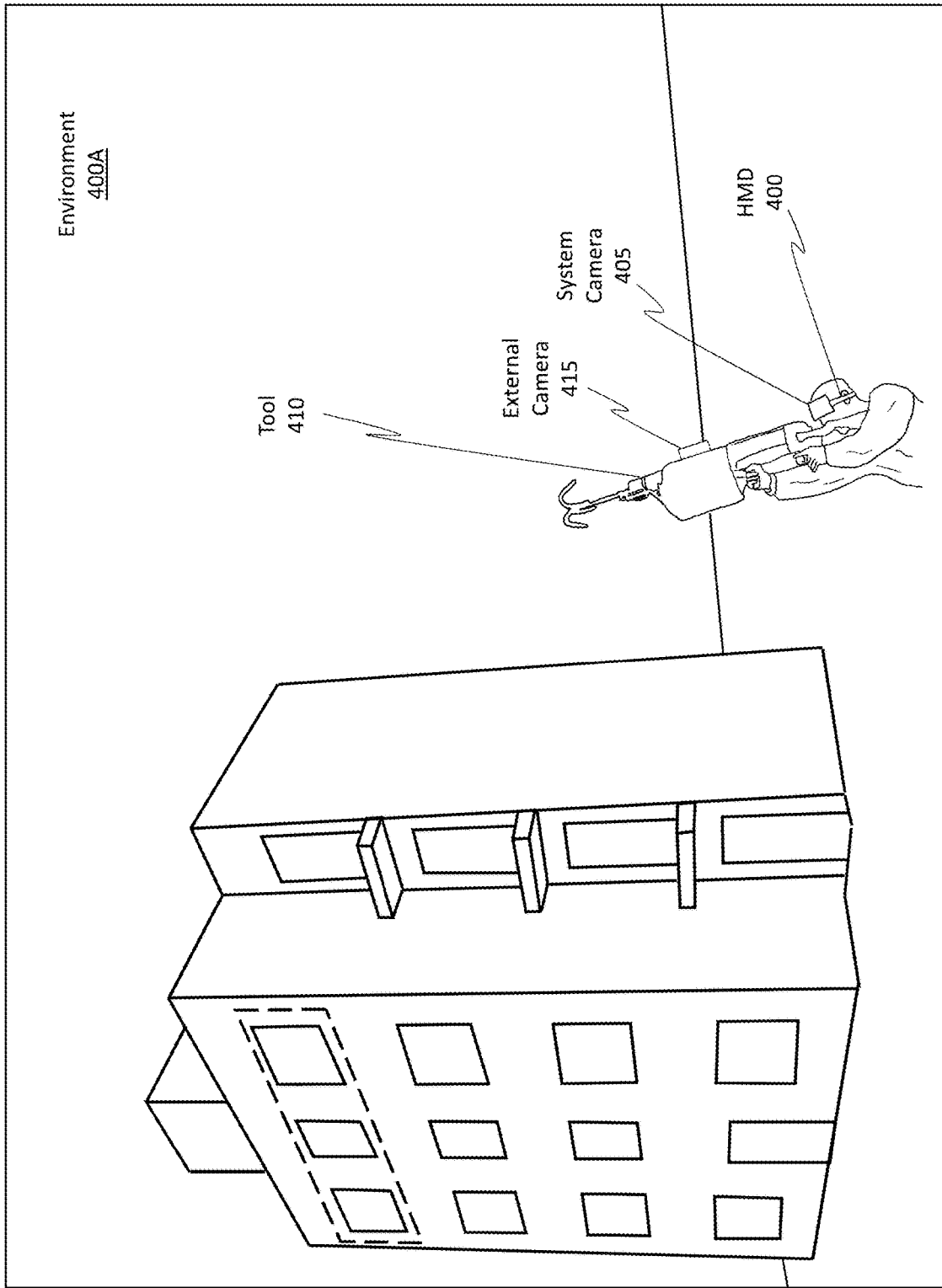
FIG. 4 illustrates another example scenario.

Attention will now be directed to FIG. 3, which illustrates an example scenario in which the HMDs discussed in FIGS. 1 and 2 may be used. FIG. 3 shows a building 300 and a first responder 305 and another first responder 310. In this example scenario, the first responders 305 and 310 are desirous to scale the building 300. FIG. 4 shows one example technique for performing this scaling feat.

FIG. 4 shows a first responder wearing an HMD 400, which is representative of the HMDs discussed thus far, in an environment 400A. HMD 400 includes a system camera 405, as discussed previously. Furthermore, the first responder is using a tool 410 that includes an external camera 415, which is representative of the external camera 255 of FIG. 2. In this case, the tool 410 is a grappling gun that will be used to shoot a rope and hook onto the building to allow the first responder to scale the building. By aligning the image content generated by the external camera 415 with the image content generated by the system camera 405, the user will be able to better discern where the tool 410 is being aimed.

Figure 5:
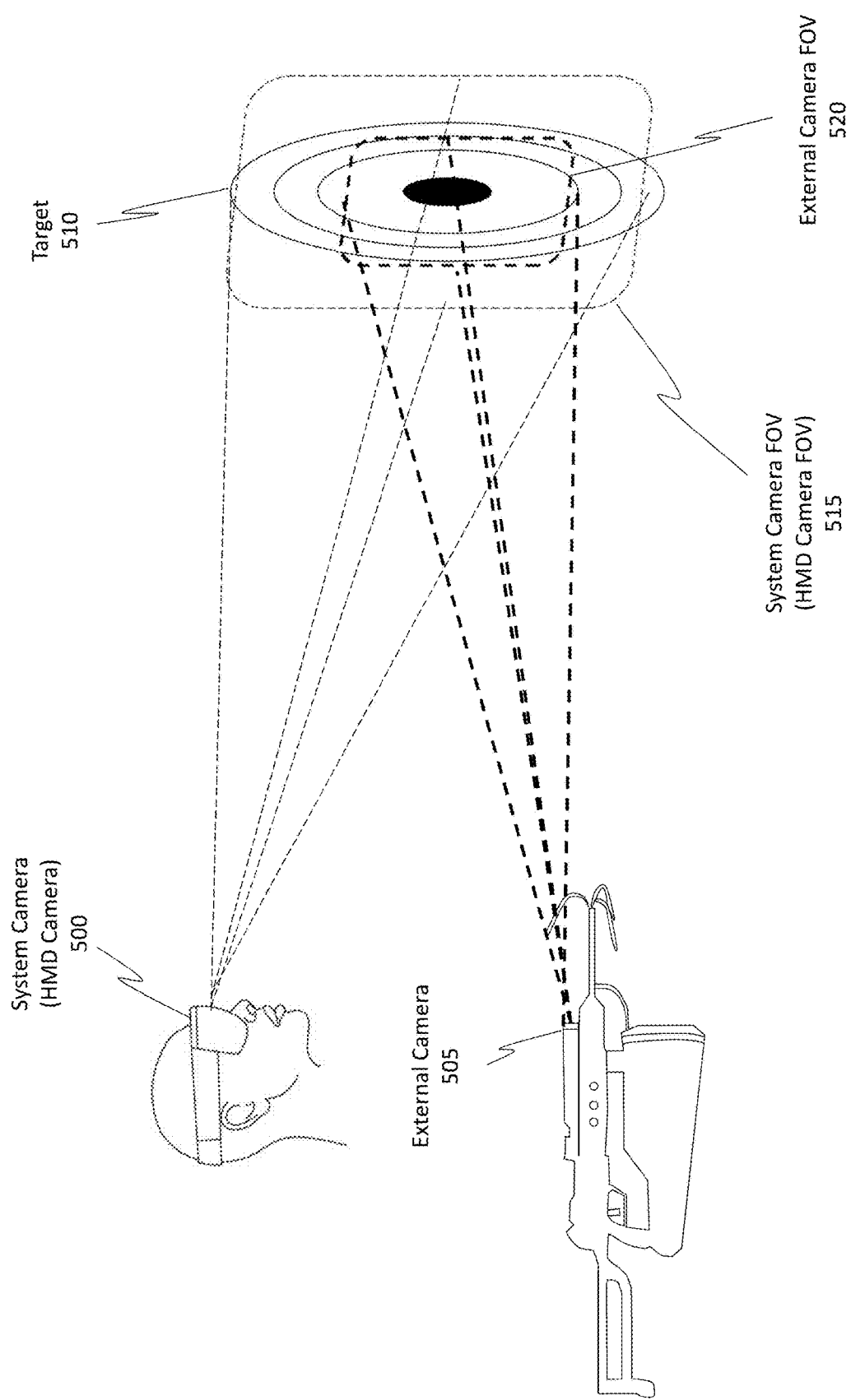
FIG. 5 illustrates how a system camera and an external camera can be used to perform the disclosed operations.

That is, in accordance with the disclosed principles, it is desirable to provide an improved platform or technique by which a user (e.g., the first responders) can aim a tool (e.g., the tool 410) using the HMD 400, the system camera 405, and the external camera 415 as a combined aiming interface. FIG. 5 shows one such example.

FIG. 5 shows a system camera 500 (aka HMD camera) mounted on an HMD, where the system camera 500 is representative of the system camera 405 of FIG. 4, and a tool (e.g., a grappling gun) that includes an external camera 505, which is representative of the external camera 415. It should be noted how the optical axis of the external camera 505 is aligned with the aiming direction of the tool. As a consequence, the images generated by the external camera 505 can be used to determine where the tool is being aimed. One will appreciate how the tool can be any type of aimable tool, without limit.

In FIG. 5, both the system camera 500 and the external camera 505 are being aimed at a target 510. To illustrate, the field of view (FOV) of the system camera 500 is represented by the system camera FOV 515 (aka HMD camera FOV), and the FOV of the external camera 505 is represented by the external camera FOV 520. Notice, the system camera FOV 515 is larger than the external camera FOV 520. Typically, the external camera 505 provides a very focused view, similar to that of a scope (i.e. a high level of angular resolution). As will be discussed in more detail later, the external camera 505 sacrifices a wide FOV for an increased resolution and increased pixel density. Accordingly, in this example scenario, one can observe how in at least some situations, the external camera FOV 520 may be entirely overlapped or encompassed by the system camera FOV 515. Of course, in the event the user aims the external camera 505 in a direction where the system camera 500 is not aimed at, then the system camera FOV 515 and the external camera FOV 520 will not overlap.

Figure 6:
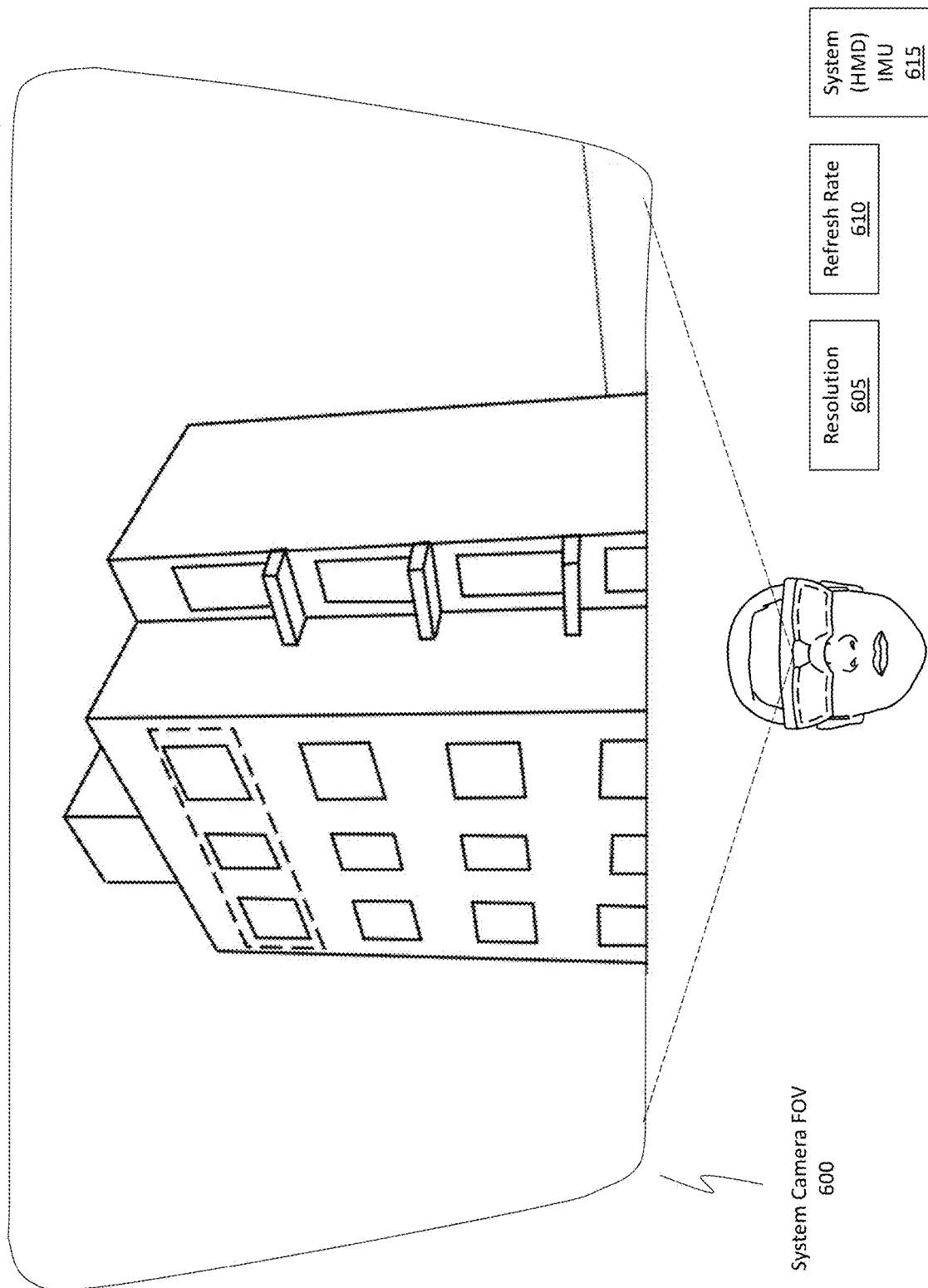
FIG. 6 illustrates the field of view (FOV) of a system camera.

FIG. 6 shows the system camera FOV 600, which is representative of the system camera FOV 515 of FIG. 5. The system camera FOV 600 will be captured by the system camera in the form of a system camera image and will potentially be displayed in the form of a passthrough image. The system camera images have a resolution 605 and are captured by the system camera based on a determined refresh rate 610 of the system camera. The refresh rate 610 of the system camera is typically between about 30 Hz and 120 Hz. Often, the refresh rate 610 is around 90 Hz or at least 60 Hz. Often, the system camera FOV 600 has at least a 55 degree horizontal FOV. The horizontal baseline of the system camera FOV 600 may extend to 65 degrees, or even beyond 65 degrees.

It should also be noted how the HMD includes a system (HMD) inertial measurement unit IMU 615. An IMU (e.g., system IMU 615) is a type of device that measures forces, angular rates, and orientations of a body. An IMU can use a combination of accelerometers, magnetometers, and gyroscopes to detect these forces. Because both the system camera and the system IMU 615 are integrated with the HMD, the system IMU 615 can be used to determine the orientation or pose of the system camera (and the HMD) as well as any forces the system camera is being subjected to.

In some cases, the "pose" may include information detailing the 6 degrees of freedom, or "6 DOF," information. Generally, the 6 DOF pose refers to the movement or position of an object in three-dimensional space. The 6 DOF pose includes surge (i.e. forward and backward in the x-axis direction), heave (i.e. up and down in the z-axis direction), and sway (i.e. left and right in the y-axis direction). In this regard, 6 DOF pose refers to the combination of 3 translations and 3 rotations. Any possible movement of a body can be expressed using the 6 DOF pose.

In some cases, the pose may include information detailing the 3 DOF pose. Generally, the 3 DOF pose refers to tracking rotational motion only, such as pitch (i.e. the transverse axis), yaw (i.e. the normal axis), and roll (i.e. the longitudinal axis). The 3 DOF pose allows the HMD to track rotational motion but not translational movement of itself and of the system camera. As a further explanation, the 3 DOF pose allows the HMD to determine whether a user (who is wearing the HMD) is looking left or right, whether the user is rotating his/her head up or down, or whether the user is pivoting left or right. In contrast to the 6 DOF pose, when 3 DOF pose is used, the HMD is not able to determine whether the user (or system camera) has moved in a translational manner, such as by moving to a new location in the environment.

Determining the 6 DOF pose and the 3 DOF pose can be performed using inbuilt sensors, such as accelerometers, gyroscopes, and magnetometers (i.e. the system IMU 615). Determining the 6 DOF pose can also be performed using positional tracking sensors, such as head tracking sensors. Accordingly, the system IMU 615 can be used to determine the pose of the HMD.

Figure 7:
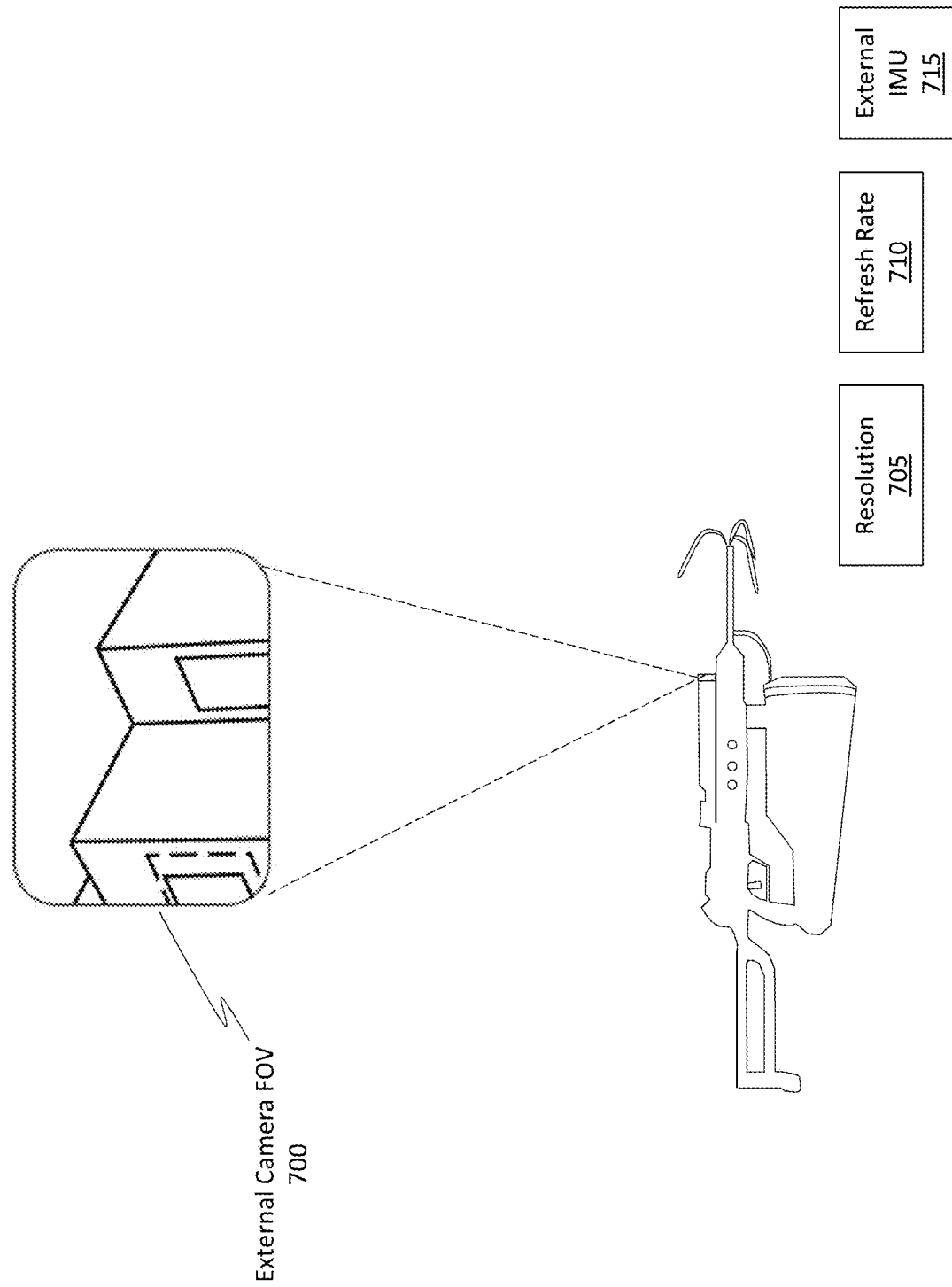
FIG. 7 illustrates the FOV of an external camera.

FIG. 7 shows an external camera FOV 700, which is representative of the external camera FOV 520 of FIG. 5. Notice, the external camera FOV 700 is smaller than the system camera FOV 600. That is, the angular resolution of the external camera FOV 700 is higher than the angular resolution of the system camera FOV 600. Having an increased angular resolution also results in the pixel density of an external camera image being higher than the pixel density of a system camera image. For instance, the pixel density of an external camera image is often 2.5 to 3 times that of the pixel density of a system camera image. As a consequence, the resolution 705 of an external camera image is higher than the resolution 605. Often, the external camera FOV 700 has at least a 19 degree horizontal FOV. That horizontal baseline may be higher, such as 20 degrees, 25 degrees, 30 degrees, or more than 30 degrees.

The external camera also has a refresh rate 710. The refresh rate 710 is typically lower than the refresh rate 610. For example, the refresh rate 710 of the external camera is often between 20 Hz and 60 Hz. Typically, the refresh rate 710 is at least about 30 Hz. The refresh rate of the system camera is often different than the refresh rate of the external camera. In some cases, however, the two refresh rates may be substantially the same.

The external camera also includes or is associated with an external IMU 715. Using this external IMU 715, the embodiments are able to detect or determine the orientation/pose of the external camera as well as any forces that the external camera is being subjected to. Accordingly, similar to the earlier discussion, the external IMU 715 can be used to determine the pose (e.g., 6 DOF and/or 3 DOF) of the external camera sight.

In accordance with the disclosed principles, it is desirable to overlap and align the images obtained from the external camera with the images generated by the system camera to generate an overlaid and aligned passthrough image. The overlap between the two images enables the embodiments to generate multiple images and then overlay image content from one image onto another image in order to generate a composite image or an overlaid image having enhanced features that would not be present if only a single image were used. As one example, the system camera image provides a broad FOV while the external camera image provides high resolution and pixel density for a focused area (i.e. the aiming area where the tool is being aimed). By combining the two images, the resulting image will have the benefits of a broad FOV and a high pixel density for the aiming area.

It should be noted that while this disclosure primarily focuses on the use of two images (e.g., the system camera image and the external camera image), the embodiments are able to align content from more than two images having overlapping regions. For instance, suppose 2, 3, 4, 5, 6, 7, 8, 9, or even 10 integrated and/or detached cameras have overlapping FOVs. The embodiments are able to examine each resulting image and then align specific portions with one another. The resulting overlaid image may then be a composite image formed from any combination or alignment of the available images (e.g., even 10 or more images, if available). Accordingly, the embodiments are able to utilize any number of images when performing the disclosed operations and are not limited to only two images or two cameras.

Figure 8:
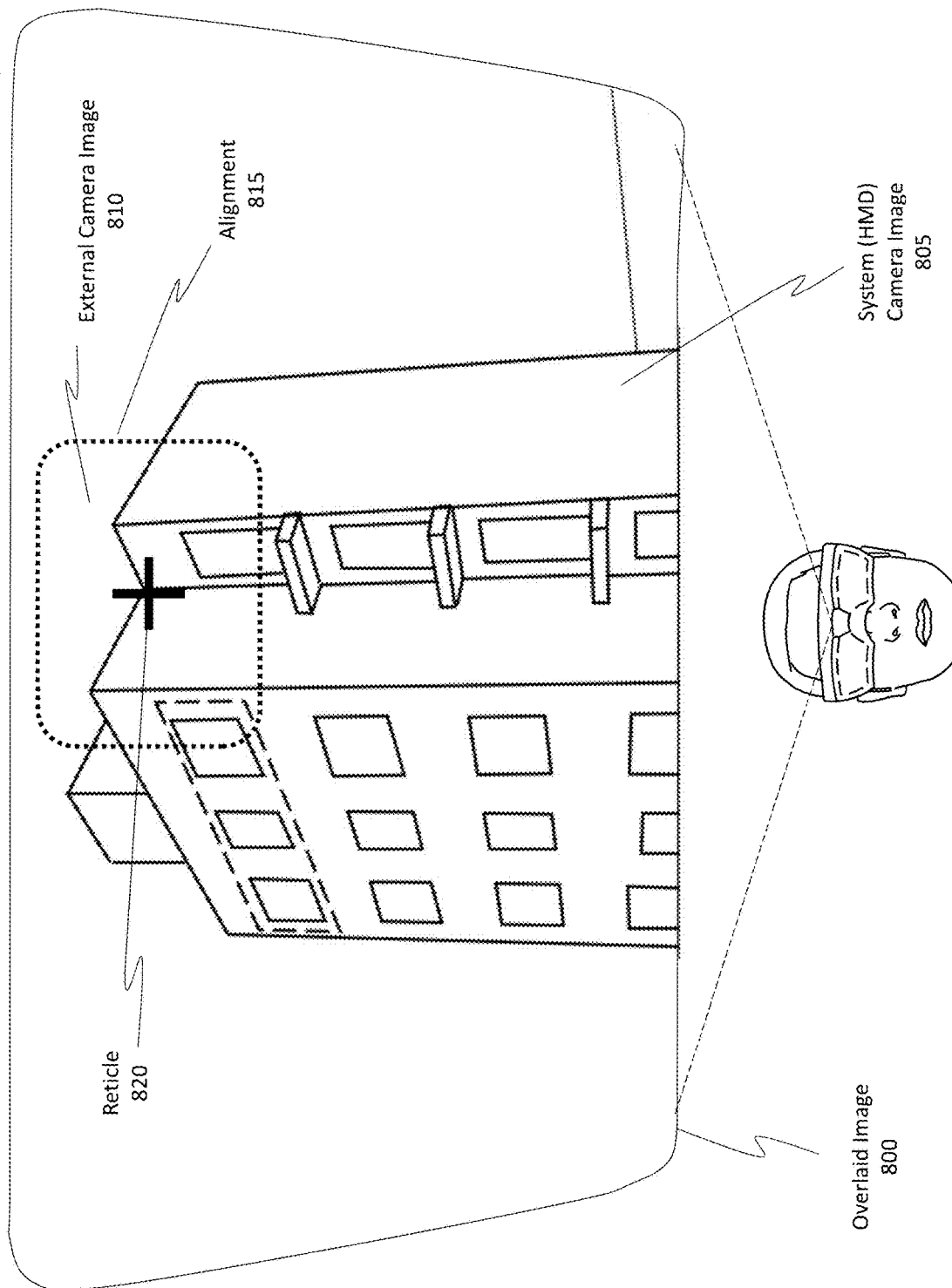
FIG. 8 illustrates an overlaid and aligned image in which image content from the external camera image is overlaid onto the system camera image.

As another example, suppose the system camera is a low light camera and further suppose the external camera is a thermal imaging camera. As will be discussed in more detail later, the embodiments are able to selectively extract image content from the thermal imaging camera image and overlay that image content onto the low light camera image. In this regard, the thermal imaging content can be used to augment or supplement the low light image content, thereby providing enhanced imagery to the user. Additionally, because the external camera has increased resolution relative to the system camera, the resulting overlaid image will provide enhanced clarity for the areas where the pixels in the external camera image are overlaid onto the system camera image. FIG. 8 provides an example of these operations and benefits.

Image Correspondences and Alignment

In accordance with the disclosed principles, the embodiments are able to align the system camera's image with the external camera's image. That is, because at least a portion of the two cameras' FOVs overlap with one another, as was described earlier, at least a portion of the resulting images include corresponding content. Consequently, that corresponding content can be identified and then a merged, fused, or overlaid image can be generated based on the similar corresponding content. By generating this overlaid image, the embodiments are able to provide enhanced image content to the user, which enhanced image content would not be available if only a single image type were provided to a user. Both the system camera's image and the external camera's images may be referred to as "texture" images.

As described earlier, different techniques can be used to perform the alignment. One technique is the "visual alignment" technique involving the detection of feature points. Another technique is the IMU-based technique that aligns images based on determined poses of the respective cameras. The visual alignment technique usually produces more accurate results.

More particularly, to merge or align the images, the embodiments are able to analyze the texture images (e.g., perform computer vision feature detection) in an attempt to find any number of feature points. As used herein, the phrase "feature detection" generally refers to the process of computing image abstractions and then determining whether an image feature (e.g., of a particular type) is present at any particular point or pixel in the image. Often, corners (e.g., the corners of a wall), distinguishable edges (e.g., the edge of a table), or ridges are used as feature points because of the inherent or sharp contrasting visualization of an edge or corner.

Any type of feature detector may be programmed to identify feature points. In some cases, the feature detector may be a machine learning algorithm. As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In accordance with the disclosed principles, the embodiments detect any number of feature points (e.g., 1, 2, 3, 4, 5, 6, 7, 8, 9, 10, 20, 30, 40, 50, 60, 70, 80, 90, 100, 200, 500, 1,000, 2,000, or more than 2,000) and then attempt to identify correlations or correspondences between the feature points detected in the system camera image and the feature points identified in the external camera image.

Some embodiments then fit the feature or image correspondence(s) to a motion model in order to overlay one image onto another image to form an enhanced overlaid image. Any type of motion model may be used. Generally, a motion model is a type of transformation matrix that enables a model, a known scene, or an object to be projected onto a different model, scene, or object.

In some cases, the motion model may simply be a rotational motion model. With a rotational model, the embodiments are able to shift one image by any number of pixels (e.g., perhaps 5 pixels to the left and 10 pixels up) in order to overlay one image onto another image. For instance, once the image correspondences are identified, the embodiments can identify the pixel coordinates of those feature points or correspondences. Once the coordinates are identified, then the embodiments can overlay the external camera sight's image onto the HMD camera's image using the rotational motion model approach described above.

In some cases, the motion model may be more complex, such as in the form of a similarity transform model. The similarity transform model may be configured to allow for (i) rotation of either one of the HMD camera's image or the external camera sight's image, (ii) scaling of those images, or (iii) homographic transformations of those images. In this regard, the similarity transform model approach may be used to overlay image content from one image onto another image. Accordingly, in some cases, the process of aligning the external camera image with the system camera image is performed by (i) identifying image correspondences between the images and then, (ii) based on the identified image correspondences, fitting the correspondences to a motion model such that the external camera image is projected onto the system camera image.

Another technique for aligning images includes using IMU data to predict poses of the system camera and the external camera. Once the two poses are estimated or determined, the embodiments then use those poses to align one or more portions of the images with one another. Once aligned, then one or more portions of one image (which portions are the aligned portions) are overlaid onto the corresponding portions of the other image in order to generate an enhanced overlaid image. In this regard, IMUs can be used to determine poses of the corresponding cameras, and those poses can then be used to perform the alignment processes. IMU data is almost always readily available. Sometimes, however, the visual alignment process might not be able to be performed.

FIG. 8 shows a resulting overlaid image 800 comprising portions (or all) of a system (HMD) camera image 805 (i.e. an image generated by the system camera) and an external camera image 810 (i.e. an image generated by the external camera). These images are aligned using an alignment process (e.g., visual alignment and/or IMU-based alignment). Optionally, additional image artifacts can be included in the overlaid image 800, such as perhaps a reticle 820 used to help the user aim the tool. By aligning the image content, a user of the tool can determine where the tool is being aimed without having to look down the tool's sights. Instead, the user can discern where the tool is being aimed by simply looking at the content displayed in his/her HMD.

Figure 9:
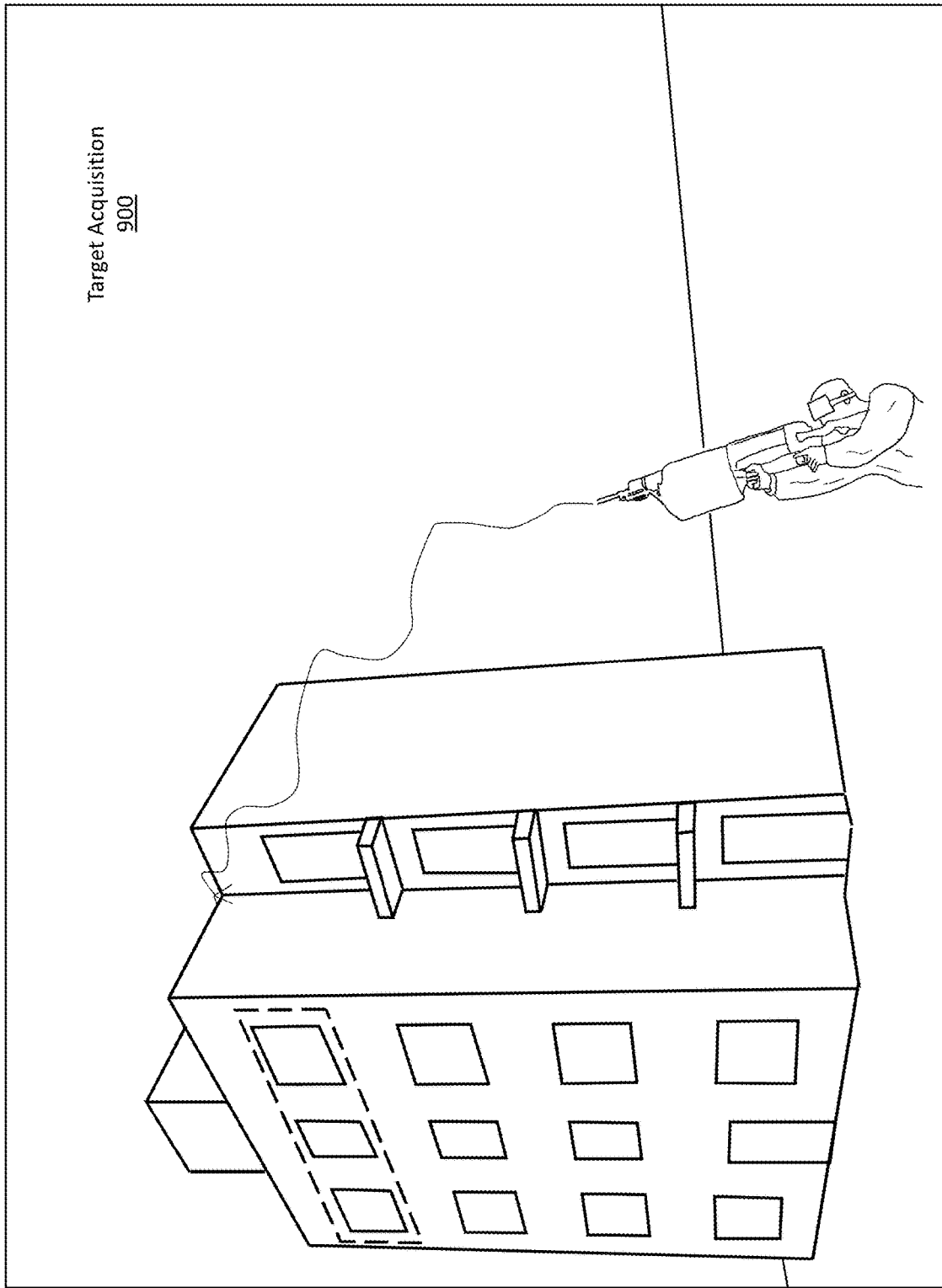
FIG. 9 illustrates another example scenario in which the principles may be practiced.

Providing the enhanced overlaid image 800 allows for rapid target acquisition, as shown by target acquisition 900 in FIG. 9. That is, a target can be acquired (i.e. the tool is accurately aimed at a desired target) in a fast manner because the user no longer has to take time to look through the tool's sights.

Hybrid Approach to Displaying the Bounding Element

Figure 10:
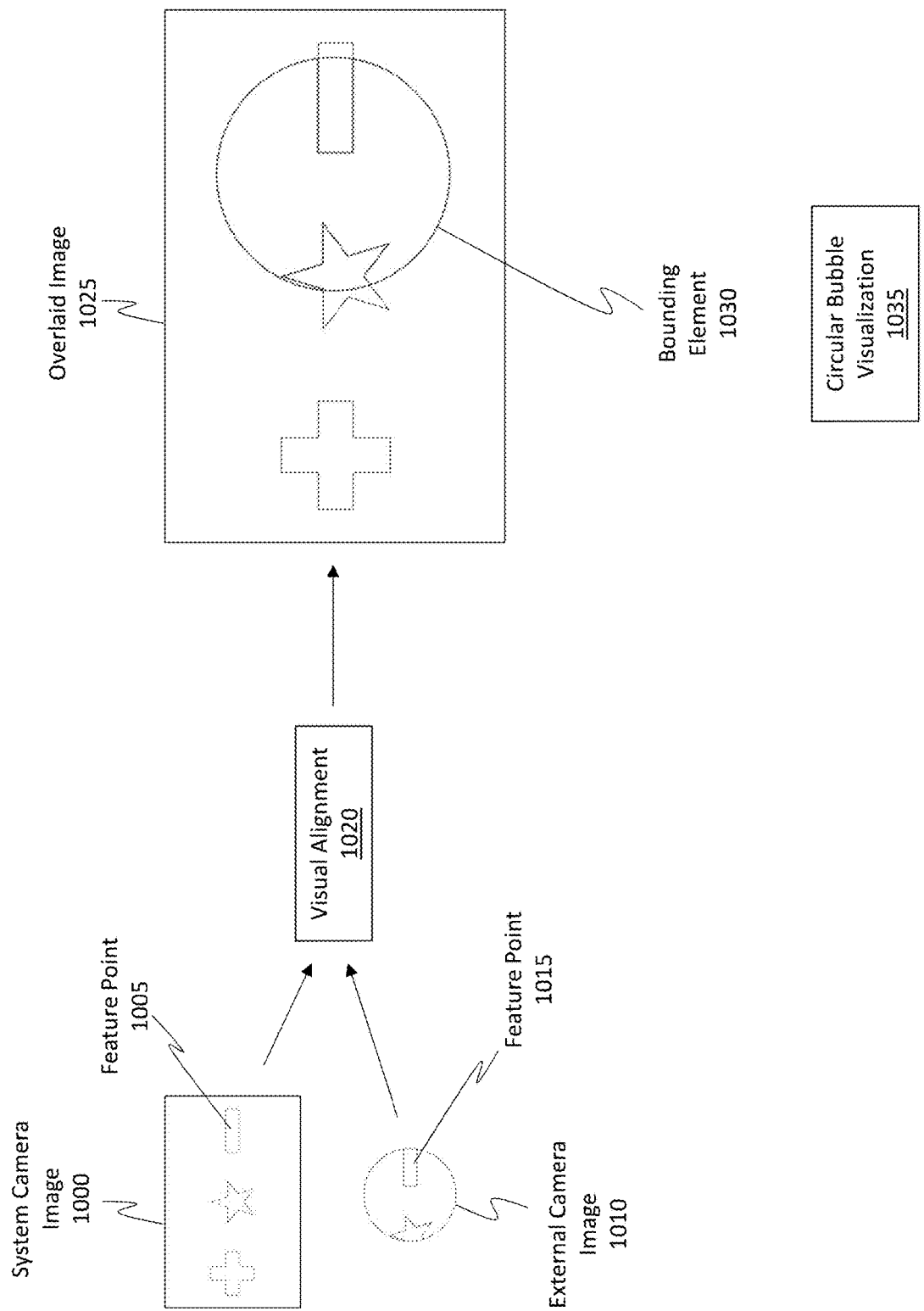
FIG. 10 illustrates how an external camera image can be overlaid onto a system camera image using a visual alignment process and how a bounding element can be displayed in a manner so as to surround the content from the external camera image.

FIG. 10 shows an abstracted version of the images discussed thus far. In particular, FIG. 10 shows a system camera image 1000 having a feature point 1005 and an external camera image 1010 having a feature point 1015 that corresponds to the feature point 1005. The embodiments are able to perform a visual alignment 1020 between the system camera image 1000 and the external camera image 1010 using the feature points 1005 and 1015 in order to produce the overlaid image 1025. The overlaid image 1025 includes portions extracted or obtained from the system camera image 1000 and portions extracted or obtained from the external camera image 1010. Notice, in some embodiments, the overlaid image 1025 includes a bounding element 1030 encompassing pixels that are obtained from the external camera image 1010 and/or from the system camera image 1000. Optionally, the bounding element 1030 may be in the form of a circular bubble visualization 1035. Other shapes may be used for the bounding element 1030, however.

Figure 11:
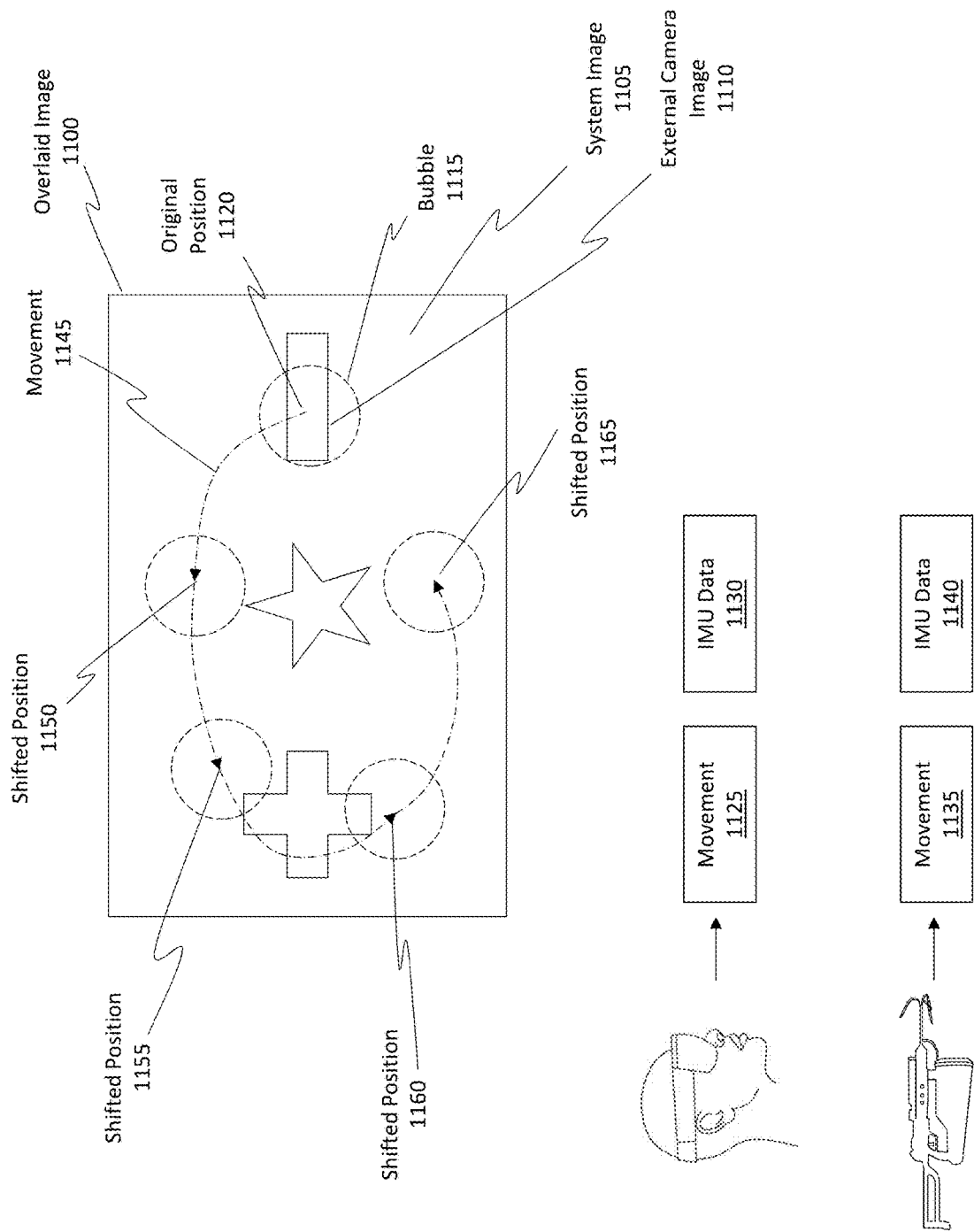
FIG. 11 illustrates how, during time periods where visual alignment processes are not performed (e.g., perhaps because an insufficient number of feature points were detected to perform visual alignment, perhaps because of insufficient lighting conditions, etc.), IMUs can be used to track movements of the system camera and/or the external camera in order to align content and in order to shift the position of the bounding element.

When the visual alignment process is not available, the embodiments can perform the IMU-based alignment process. FIG. 11 is representative.

FIG. 11 shows an overlaid image 1100, which is representative of the overlaid image 1025 from FIG. 10. For instance, it may be the case that at a first point in time, the embodiments performed the visual alignment technique. Thereafter (at least for a period of time), the embodiments performed the IMU-based technique, as shown in FIG. 11.

FIG. 11 shows how the overlaid image 1100 is formed from a system image 1105 and an external camera image 1110. The overlaid image 1100 also includes a bubble 1115 surrounding the content from the external camera image 1110. Notice, the bubble 1115 has an original position 1120. Based on movements of the HMD (e.g., movement 1125), which movements are detected by IMU data 1130 from the HMD's IMU, and based on movements of the external camera (e.g., movement 1135), which are detected by IMU data 1140 from the external camera's IMU, the embodiments are able to shift or relocate the bubble to new positions to reflect the movements of the HMD and external camera.

For instance, over a given period of time, there is relative movement 1145 between the HMD and the external camera, resulting in the bubble 1115 relocating to new positions, such as shifted position 1150 at one point in time, shifted position 1155 at another point in time, shifted position 1160 at another point in time, and shifted position 1165 at another point in time. These shifted positions were determined using the IMU data 1130 and 1140.

At another point in time, the option to perform visual alignment is now available (e.g., perhaps now a sufficient number of feature points are detectable). Accordingly, the embodiments are able to use a hybrid approach in which the visual alignment process and the IMU-based process are performed in order to generate an overlaid image and to relocate the bounding element based on detected movement.

Figure 12:
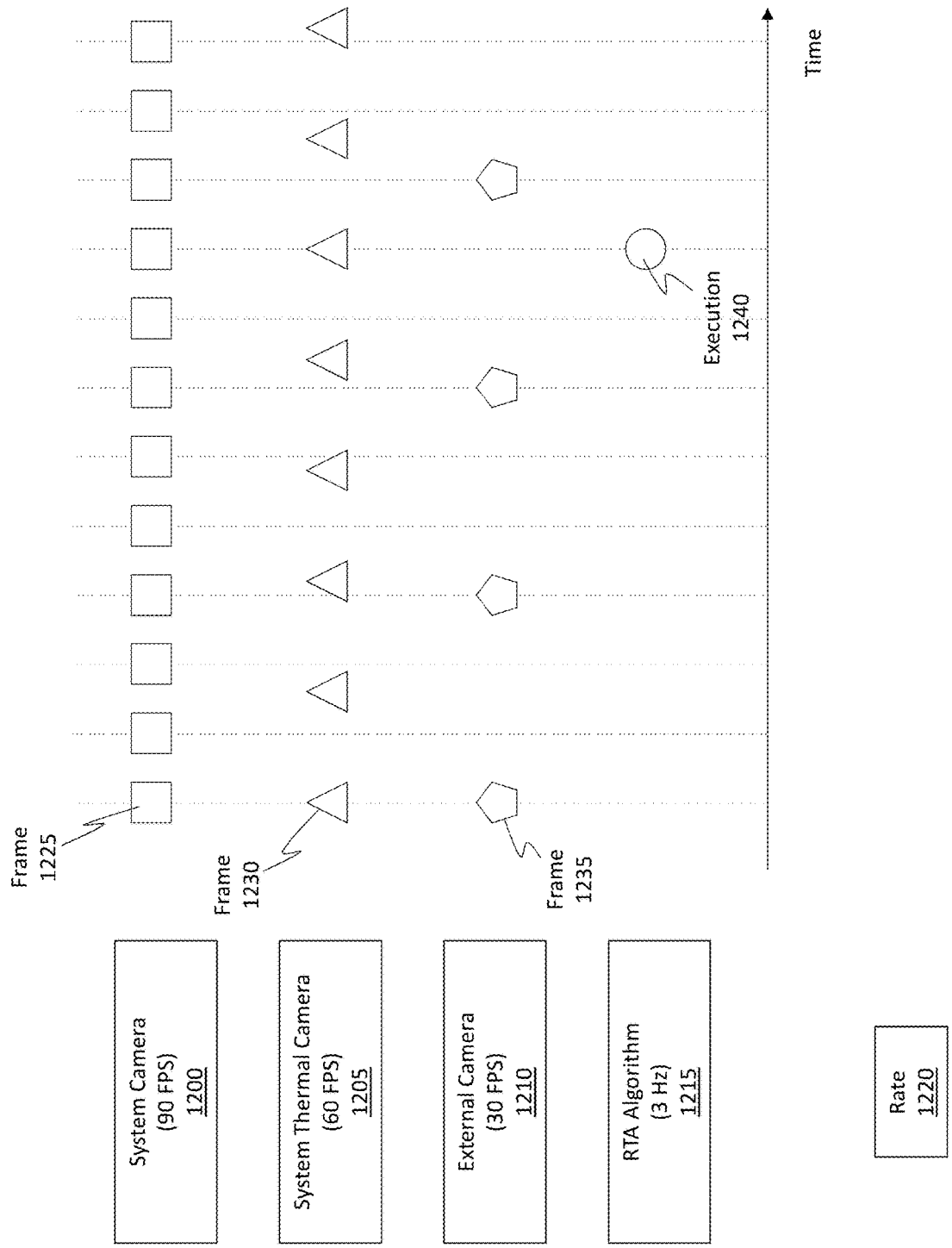
FIG. 12 illustrates the differences in timing as to when the various components are fired or triggered relative to one another.

Improved Approach to Selecting Images to Increase the Likelihood of Success of Performing Visual Alignment Attention will now be directed to FIG. 12, which shows a system camera 1200, a system thermal camera 1205, and an external camera 1210. These cameras are representative of those cameras discussed thus far. As illustrated, system camera 1200 can be configured to operate at a FPS rate of about 90 FPS. In some cases, the system camera 1200 operates within a FPS range, such as a range spanning anywhere between about 30 FPS to 120 FPS. The system thermal camera 1205 operates at a FPS rate of about 60 FPS. In some cases, the system thermal camera 1205 operates within a FPS range, such as a range spanning anywhere between about 30 FPS and 90 FPS. The external camera 1210 can be configured to operate at a FPS rate of about 30 FPS, or perhaps within a range spanning anywhere between about 15 FPS and 60 FPS.

The rapid target acquisition "RTA" algorithm 1215 is the algorithm that uses the visual alignment process to generate overlaid images. The RTA algorithm can be performed in conjunction with the IMU-based process. Typically, the visual alignment process (i.e. performance of the RTA algorithm) is performed at a rate of about 3 Hz. The IMU-based process can be performed more frequently, but it is less accurate. For example purposes only, the RTA algorithm 1215 is illustrated as occurring at a rate of 3 Hz. Accordingly, various different rates (e.g., as shown by rate 1220) are being used to perform various different processes.

FIG. 12 shows a frame 1225 generated by the system camera 1200. Although not labeled, the other squares next to the one labeled frame 1225 also represent frames or images generated by the system camera 1200. Here, these frames are generated at a rate of about 90 FPS.

Frame 1230 (i.e. the triangle) is representative of a frame generated by the system thermal camera 1205. The other triangles represent other images or frames generated by the system thermal camera 1205. These frames are generated at a slower rate than the frames generated by the system camera 1200. This rate is about 60 FPS.

Frame 1235 (i.e. the pentagon) is representative of a frame generated by the external camera 1210. The other pentagons represent other images or frames generated by the external camera 1210. These frames are generated at a slower rate than the frames generated by the system camera 1200 or the system thermal camera 1205.

The circle (labeled execution 1240) represents an instance in time when the RTA algorithm 1215 is triggered and performs a visual alignment process in order to generate an overlaid image. Although only a single circle or instance is illustrated, it may be the case that the RTA algorithm 1215 is triggered more frequently. Furthermore, the embodiments can perform the IMU-based operation more or less frequently. That is, regarding the visual alignment process, the RTA algorithm 1215 is often performed at a rate of about 3 Hz.

Notice, prior in time to when the execution 1240 occurs, the system camera 1200, the system thermal camera 1205, and the external camera 1210 have all generated multiple images respectively. Traditionally, the RTA algorithm 1215 would rely on the most recently generated image in order to attempt to perform image alignment. Often, however, the quality of that most recently generated image would not satisfy a quality threshold, and the visual alignment process would often fail, resulting in the IMU-based approach needing to be performed.

Figure 13:
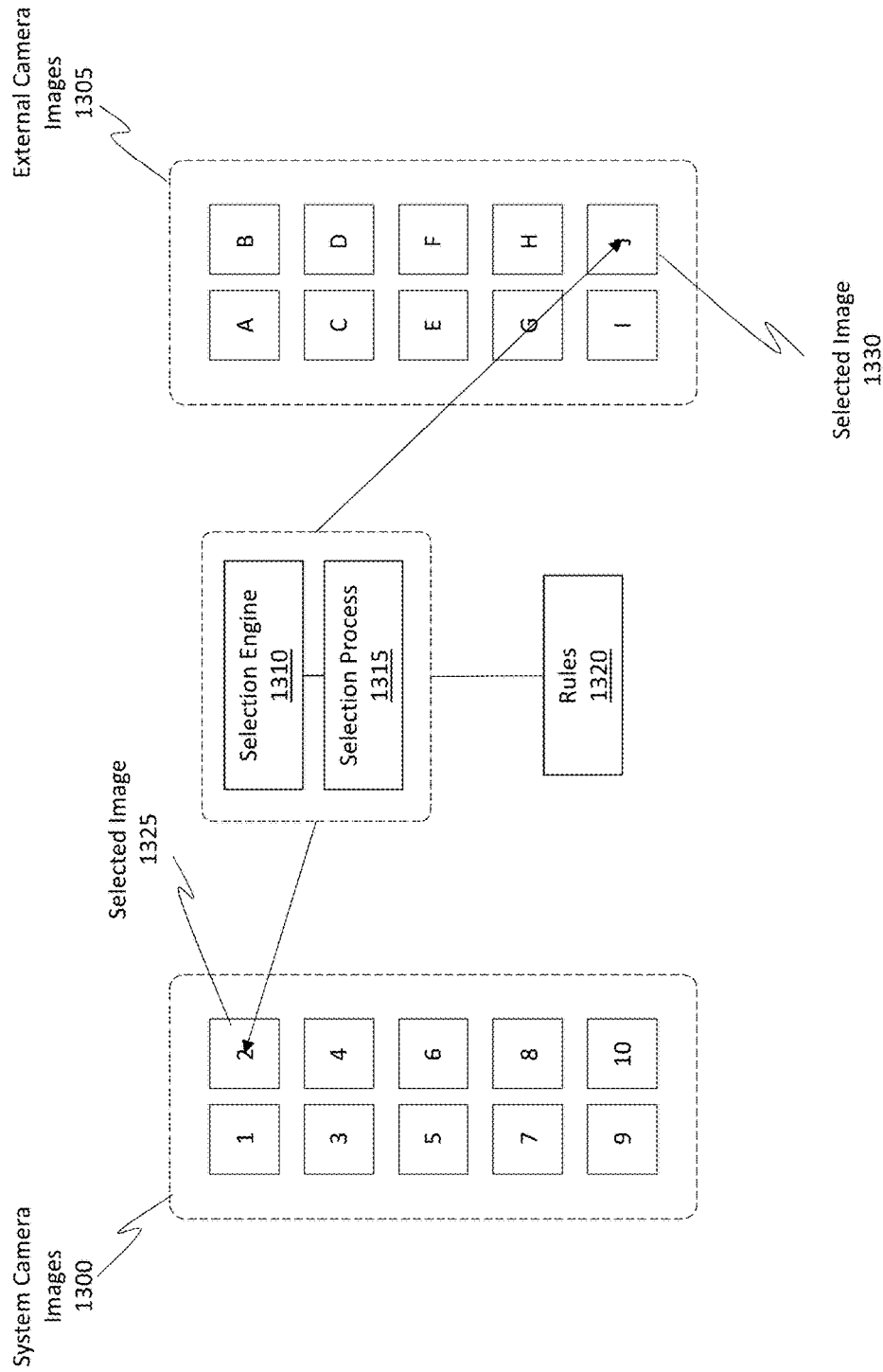
FIG. 13 illustrates an intelligent selection process for selection, from among multiple candidate frames, specific frames to serve as the ones that are used for the generation of the overlaid image.

In accordance with the disclosed principles, instead of relying on or using only the most recently generated image to perform visual alignment, the disclosed embodiments are able to consider all or at least multiple images that have been generated since the last time a visual alignment process was performed. The embodiments can review and analyze those images to determine which images will provide the highest likelihood for a successful visual alignment process. FIG. 13 is illustrative.

FIG. 13 shows a set of system camera images 1300 labeled 1, 2, 3, 4, 5, 6, 7, 8, 9, and 10. FIG. 13 also shows a set of external camera images 1305 labeled A, B, C, D, E, F, G, H, I, and J. Image "1" is the earliest-generated image and has the oldest timestamp while image "10" is the most recently generated image and has the youngest or most recent timestamp. Similarly, image "A" is the earliest-generated image and has the oldest timestamp while image "J" is the most recently generated image and has the youngest or most recent timestamp. In some cases, the system makes an assumption that the images in the system camera set as well as the images in the external camera set mostly show stationary (i.e. non-moving) objects.

These images are representative of the images illustrated in FIG. 12. For instance, the system camera images 1300 can optionally be the square images or the triangle images illustrated in FIG. 12. Similarly, the external camera images 1305 can optionally be the pentagon images illustrated in FIG. 12.

In accordance with the disclosed principles, an intelligent selection engine 1310 (e.g., perhaps a machine learning engine using any of the machine learning models discussed previously) can perform a selection process 1315 based on a set of rules 1320 to intelligently select a specific image from the system camera images 1300 (e.g., the selected image 1325) and to intelligently select a specific image from the external camera images 1305 (e.g., the selected image 1330). After being selected, these images are then used to generate the overlaid image mentioned earlier.

Notice, although the selected image 1330 is the most-recently generated image, the selected image 1325 is not the most-recent generated image. That is, it may be the case (though not always) that the timestamps of the two selected images are not the same as one another and may be quite different. Regardless of any difference in timestamps, the embodiments selected these images because the selection engine 1310 determined those images would provide the best or highest likelihood of a successful visual alignment process, where that determination was based on the set of rules.

Because there may optionally be a difference between the timestamps of the selected images, it may be the case the poses or content of those images are different relative to one another. In an effort to resolve such differences, the embodiments can perform one or more transformations on one or both of the images to bring them into proper alignment one with another. For instance, any of the techniques mentioned earlier (e.g., modifying the model, performing reprojections, etc.) can be performed. After adequate reprojection of the images is performed, then the content from the external camera image can be aligned and overlaid onto the content of the system camera image in the manner discussed previously. One way to accomplish this reprojection is by using pose data obtained by a tracking system or from the IMU. The reprojection then corrects the pose difference between the time stamp at which the image was recorded and the desired time stamp (e.g., the time stamp at which the image is displayed).

Figure 14:
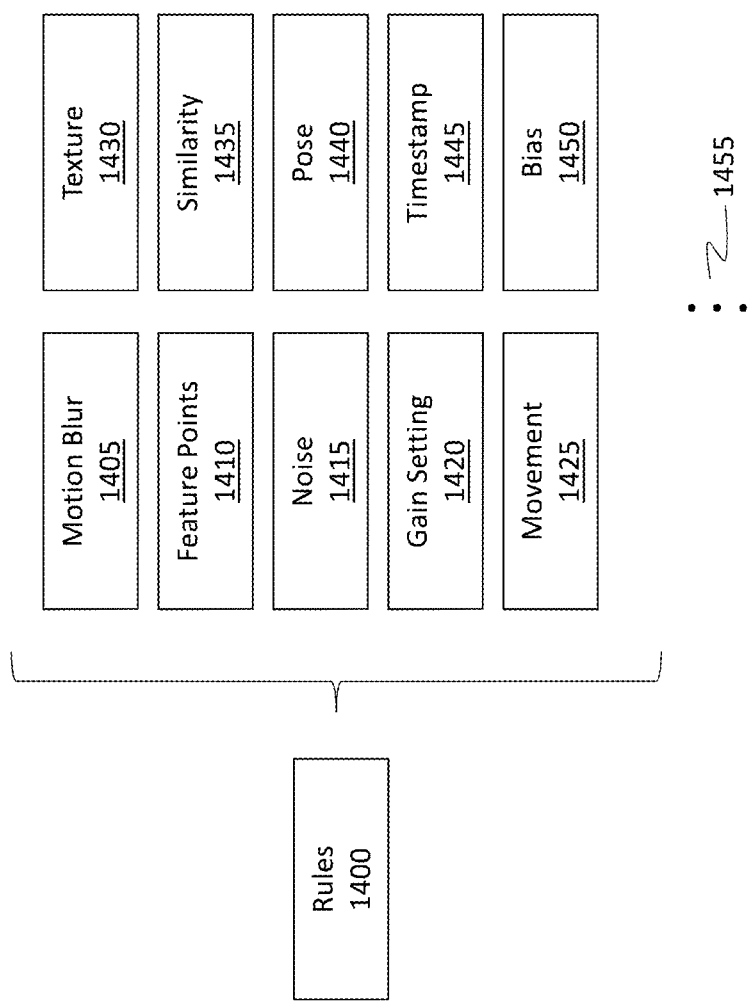
FIG. 14 illustrates various factors or parameters that can be incorporated into or considered by a set of rules, which are used to determine which frames to select.

FIG. 14 more fully details aspects of the rules 1320 mentioned in FIG. 13. That is, the rules 1400 of FIG. 14 are representative of the rules 1320.

The rules 1400 govern which image, from among multiple candidate images (e.g., the system camera images 1300 and the external camera images 1305 of FIG. 13) will be selected for use by the RTA algorithm. As shown in FIG. 14, various different parameters or factors can be considered by the rules 1400 when the selection process is performed.

One example factor that is considered is the amount of motion blur 1405 that is detected in each image. By way of example, the embodiments are able to analyze each of the images (e.g., images 1-10 and images A-J in FIG. 13) to determine the amount of motion blur 1405 that is present in each respective image. Images that have an amount of motion blur exceeding a predefined threshold can be discarded and thus not considered. Accordingly, motion blue 1405 is a factor that can be considered when selecting an image based on the rules 1400.

Another factor relates to the number of detectable feature points 1410 that are observable in each respective image. For instance, the embodiments are able to analyze each image to attempt to identify feature points. Images that do not have a threshold number of feature points can be discarded. The feature points 1410 can also refer to the number of feature points that commonly exist between the various images. That is, while a large number of feature points may be detectable in any two individual images, if the number of common feature points that commonly exist between those two images does not satisfy a threshold value, then those images can be discarded because a sufficient number of correlations between the two images could not be determined.

The embodiments can also consider the amount of noise 1415 that is present in an image. The higher the amount of noise 1415, the lower the quality of the image. Therefore, images whose noise exceeds a particular threshold can be discarded. In some example cases, the embodiments consider the gain setting 1420 of the camera that generated the image. A higher gain setting suggests the resulting image will have a higher noise amount. Therefore, if a gain setting exceeds a predefined gain setting threshold, then the resulting image can be discarded.

The amount of movement 1425 can also be considered by the rules 1400. Movement 1425 can be determined by comparing the content of one image to another image. If the comparison shows that the pixel content is similar, then there was relatively little movement. On the other hand, if the pixel content is quite different (e.g., a threshold number of pixels are not common between the two images), then a large amount of movement has occurred. If a threshold amount of movement 1425 is detected (e.g., by comparing and contrasting pixel content), then an image can be discarded.

The amount of texture 1430 in an image can also be a factor for consideration. Texture 1430 generally refers to the spatial arrangement of color in an image, or rather to the spatial arrangement of intensities in an image. If a threshold amount of texture 1430 is not detected in an image then the image can be discarded.

Similarity 1435 refers to how similar one image is to another image. For instance, the similarity 1435 is similar to the movement 1425 factor in that pixels between two or more different frames can be compared and contrasted. The similarity determination can be based on the images overall or it can be based on specific portions of images. High degrees of similarity between at least two images leads to higher accuracy results whereas lower degrees of similarity between at least two images leads to lower accuracy results. In some cases, the similarity 1435 can also or alternatively refer to a scenario where it is desirable to select images that are different from previously selected images. That is, the similarity 1435 can indicate that any currently selected images are to be different than any previously selected images.

The pose 1440 for an image can be compared against the pose of another image to determine how close those images are related one to another. Higher correlations in pose lead to higher accuracy results whereas lower correlations in pose lead to lower accuracy results.

A comparison between timestamps (e.g., timestamp 1445) can also be performed. Because images are generated over time, there is a possibly that movement has occurred or that new content has entered the scene (i.e. the area where the cameras are directed). Prolonged periods of time often result in the images becoming stale. "Fresh" images (i.e. images that are generated closer in time to when the visual alignment process is performed) are preferred over stale images (i.e. old images). The embodiments can, therefore, introduce or incorporate a bias 1450 that weights or favors more recently generated images over older images. The bias 1450 can also be used to weight or favor other factors as well, based on a design preferences. The ellipsis 1455 illustrates how other factors or conditions can be included in the rules 1400.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 15:
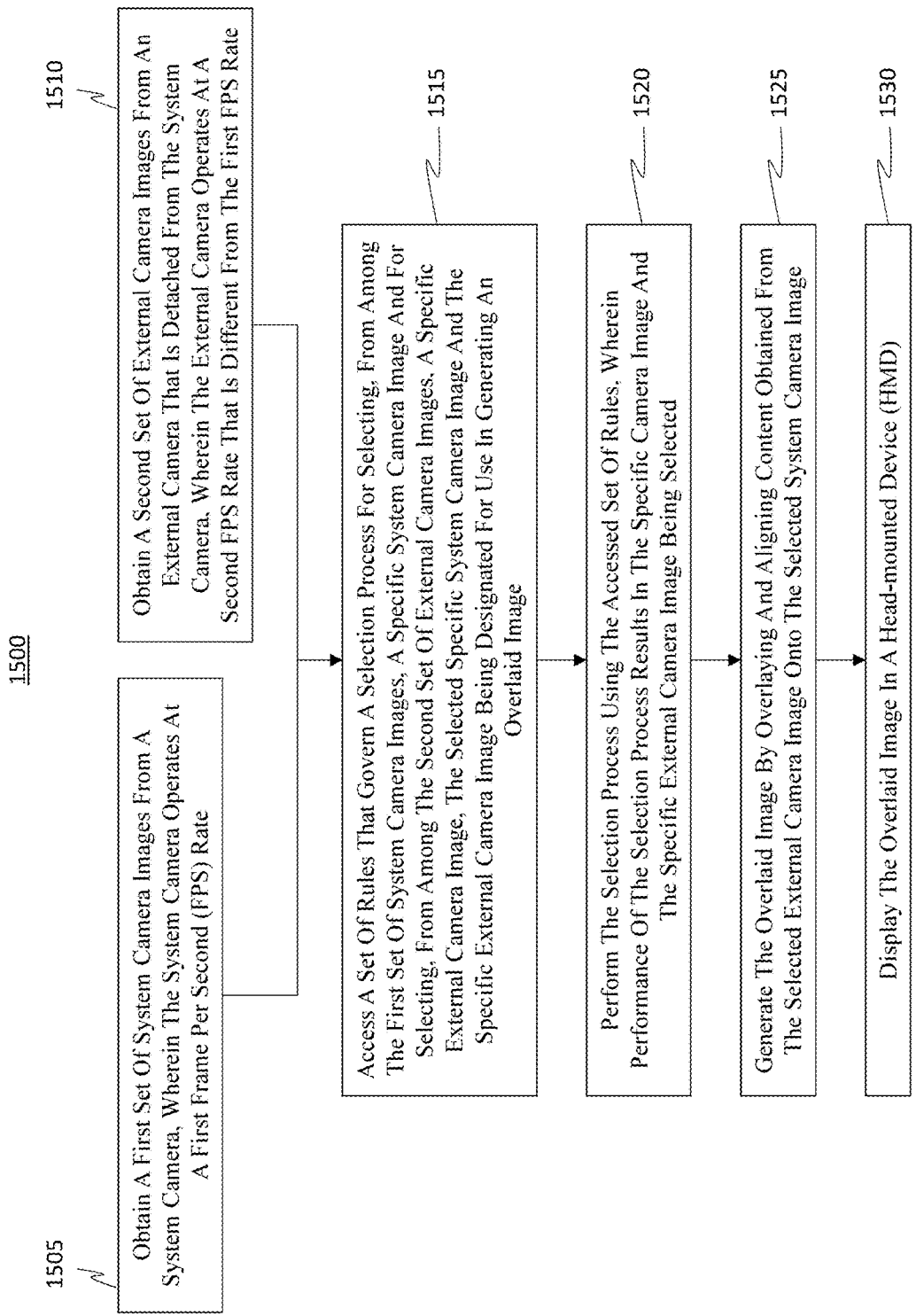
FIG. 15 illustrates a flowchart of an example method for selecting, from among multiple candidate frames, specific frames that are used for generating an overlaid image.

Attention will now be directed to FIG. 15, which illustrates a flowchart of an example method 1500 for evaluating a plurality of images originating from multiple different sources and for selecting specific images from that plurality in order to generate an overlaid image. Method 1500 can be performed by any of the systems or HMDs (which can include a system camera) discussed thus far. More specifically, method 1500, or at least parts thereof, can be performed by the selection engine 1310 of FIG. 13.

Initially, method 1500 includes an act (act 1505) of obtaining a first set of system camera images (e.g., system camera images 1300 of FIG. 13) from a system camera (e.g., system camera 500 of FIG. 5). The system camera operates at a first frame per second (FPS) rate. For instance, the first FPS rate can be at least 60 FPS. In some cases, the first FPS is at least 90 FPS.

In parallel or in serial with act 1505, act 1510 includes obtaining a second set of external camera images (e.g., external camera images 1305 from FIG. 13) from an external camera (e.g., external camera 505 of FIG. 5) that is detached from the system camera. The external camera operates at a second FPS rate that is different from the first FPS rate. As an example, the second FPS rate can be at least 30 FPS. Typically, the second FPS rate is less than the first FPS rate (e.g., such as one half that of the first FPS rate, though it is often even less than one half).

Act 1515 includes accessing a set of rules (e.g., rules 1400 of FIG. 14) that govern a selection process (e.g., selection process 1315 of FIG. 13) for selecting, from among the first set of system camera images, a specific system camera image and for selecting, from among the second set of external camera images, a specific external camera image. The selected specific system camera image and the specific external camera image are designated for use in generating an overlaid image (e.g., overlaid image 1025 of FIG. 10).

The set of rules can depend on one or more of the parameters mentioned in FIG. 14. As an example, the parameters can include a motion blur detected for each image in the first set of system camera images and in the second set of system camera images. The parameters can include on a detected number of feature points detected for each image in the first set of system camera images and in the second set of system camera images. The parameters can include a noise level detected for each image in the first set of system camera images and in the second set of system camera images. The parameters can include a similarity factor detected between at least two images included in the first set of system camera images and in the second set of system camera images, where the similarity factor indicates that the selected images are to be different than previously selected images. The parameters can include an amount of movement that is detected between at least two images included in the first set of system camera images and in the second set of system camera images. The parameters can include an amount of texture detected for each image in the first set of system camera images and in the second set of system camera images. The parameters can include a gain setting that was used to generate each image in the first set of system camera images and in the second set of system camera images. The parameters can include a pose detected for each image in the first set of system camera images and in the second set of system camera images. The parameters can also include a timestamp determined for each image in the first set of system camera images and in the second set of system camera images. Optionally, the set of rules can include a bias that, when implemented, favors (e.g., weights) selection of images having later timestamps over images that have earlier timestamps. In order words, images that were generated more recently can optionally be favored over images that were generated earlier in time.

Act 1520 involves performing the selection process using the accessed set of rules. Performance of the selection process results in the specific system camera image and the specific external camera image being selected. For instance, FIG. 13 shows how the selection process 1315 results in the selected image 1325 and the selected image 1330 being selected. Typically, the selection process is performed at about a rate of 3 Hz. In some cases, the selection process is performed at a rate of about 1/10 of the second FPS rate. Of course, the RTA rate can vary and can be within a range between about 1 Hz and about 10 Hz. In some implementations, the selected specific system camera image (and/or even the selected specific external camera image) is not a most-recently generated image. For instance, FIG. 13 shows how image "2" was selected, even though that image was earlier in time relative to image "10."

Act 1525 then includes generating the overlaid image by overlaying and aligning content obtained from the selected external camera image onto the selected system camera image. For instance, FIG. 10 shows the visual alignment 1020 process and the resulting overlaid image 1025.

Act 1530 is an optional act in which the overlaid image is then displayed in a HMD. Accordingly, the disclosed embodiments are able to intelligently select images that are determined to improve the likelihood of successfully performing a visual alignment process.

Example Computer/Computer Systems

Figure 16:
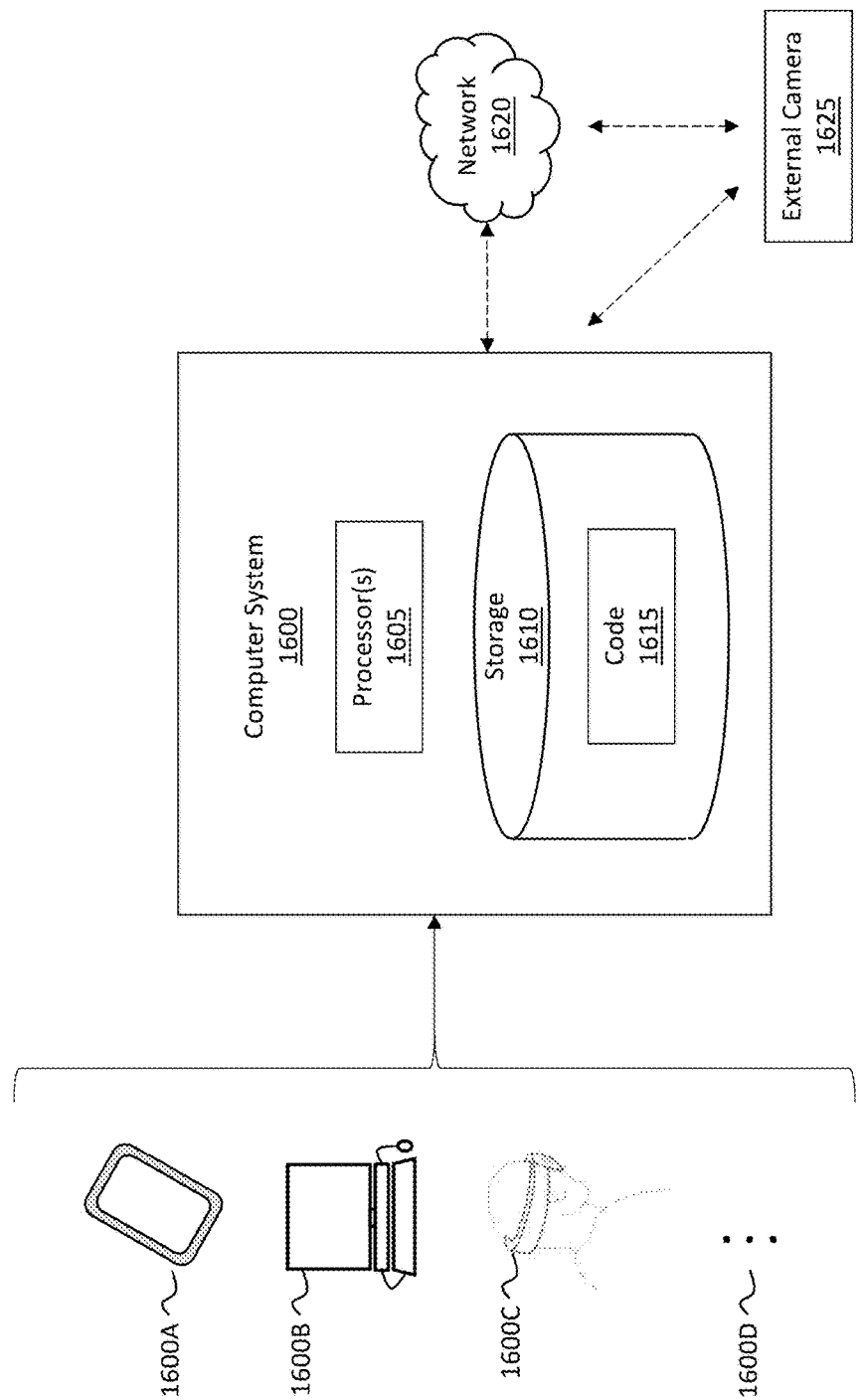
FIG. 16 illustrates an example computer system configured to perform any of the disclosed operations.

Attention will now be directed to FIG. 16 which illustrates an example computer system 1600 that may include and/or be used to perform any of the operations described herein. Computer system 1600 may take various different forms. For example, computer system 1600 may be embodied as a tablet 1600A, a desktop or a laptop 1600B, a wearable device 1600C (e.g., any of the HMDs discussed herein), a mobile device, or any other standalone device. The ellipsis 1600D illustrates how other form factors can be used. Computer system 1600 may also be a distributed system that includes one or more connected computing components/ devices that are in communication with computer system 1600.

In its most basic configuration, computer system 1600 includes various different components. FIG. 16 shows that computer system 1600 includes one or more processor(s) 1605 (aka a "hardware processing unit") and storage 1610.

Regarding the processor(s) 1605, it will be appreciated that the functionality described herein can be performed, at least in part, by one or more hardware logic components (e.g., the processor(s) 1605). For example, and without limitation, illustrative types of hardware logic components/ processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1600. The different components, modules, engines, and services described herein may be implemented as objects or processors that execute on computer system 1600 (e.g. as separate threads).

Storage 1610 may be physical system memory, which may be volatile, non-volatile, or some combination of the two. The term "memory" may also be used herein to refer to non-volatile mass storage such as physical storage media. If computer system 1600 is distributed, the processing, memory, and/or storage capability may be distributed as well.

Storage 1610 is shown as including executable instructions 1615. The executable instructions 1615 represent instructions that are executable by the processor(s) 1605 of computer system 1600 to perform the disclosed operations, such as those described in the various methods.

The disclosed embodiments may comprise or utilize a special-purpose or general-purpose computer including computer hardware, such as, for example, one or more processors (such as processor(s) 1605) and system memory (such as storage 1610), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RANI, ROM, EEPROM, CD-ROM, solid state drives ("SSD") that are based on RANI, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1600 may also be connected (via a wired or wireless connection) to external sensors (e.g., one or more remote cameras) or devices via a network 1620. For example, computer system 1600 can communicate with any number devices (e.g., external camera 1625 such as an external camera) or cloud services to obtain or process data. In some cases, network 1620 may itself be a cloud network. Furthermore, computer system 1600 may also be connected through one or more wired or wireless networks to remote/ separate computer systems(s) that are configured to perform any of the processing described with regard to computer system 1600.

A "network," like network 1620, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1600 will include one or more communication channels that are used to communicate with the network 1620. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RANI and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system configured to evaluate a plurality of images originating from multiple different sources and to select specific images from said plurality in order to generate an overlaid image, said computer system comprising:
   one or more processors; and
   one or more computer-readable hardware storage devices that store instructions that are executable by the one or more processors to cause the computer system to:
      obtain a first set of system camera images from a system camera, wherein the system camera operates at a first frame per second (FPS) rate;
      obtain a second set of external camera images from an external camera that is detached from the system camera, wherein the external camera operates at a second FPS rate that is different from the first FPS rate;
      access a set of rules that govern a selection process for selecting, from among the first set of system camera images, a specific system camera image and for selecting, from among the second set of external camera images, a specific external camera image, the selected specific system camera image and the specific external camera image being designated for use in generating an overlaid image;
      perform the selection process using the accessed set of rules, wherein performance of the selection process results in the specific system camera image and the specific external camera image being selected; and
      generate the overlaid image by overlaying and aligning content obtained from the selected external camera image onto the selected system camera image.

2. The computer system of claim 1, wherein the first FPS rate is at least 60 FPS.

3. The computer system of claim 1, wherein the second FPS rate is at least 30 FPS.

4. The computer system of claim 3, wherein the second FPS rate is less than the first FPS rate.

5. The computer system of claim 1, wherein the selection process is performed at a rate of about 3 Hz.

6. The computer system of claim 1, wherein the selection process is performed at a rate of about 1/10 of the second FPS rate.

7. The computer system of claim 1, wherein the set of rules is dependent on one or more of the following parameters:
   a motion blur detected for each image in the first set of system camera images and in the second set of system camera images;
   a detected number of feature points detected for each image in the first set of system camera images and in the second set of system camera images;
   a noise level detected for each image in the first set of system camera images and in the second set of system camera images;
   a similarity factor detected between at least two images included in the first set of system camera images and/or in the second set of system camera images, said similarity factor indicating that the at least two images are to be different than previously selected images;
   an amount of movement that is detected between at least two images included in the first set of system camera images and/or in the second set of system camera images;
   an amount of texture detected for each image in the first set of system camera images and in the second set of system camera images;
   a gain setting that was used to generate each image in the first set of system camera images and in the second set of system camera images;
   a pose detected for each image in the first set of system camera images and in the second set of system camera images; and
   a timestamp determined for each image in the first set of system camera images and in the second set of system camera images.

8. The computer system of claim 1, wherein the set of rules includes a bias that, when implemented, favors selection of images having later timestamps over images that have earlier timestamps.

9. The computer system of claim 1, wherein the first FPS rate is at least 90 FPS.

10. The computer system of claim 1, wherein the selected specific system camera image is not a most-recently generated image included in the first set of system camera images.

11. A method for evaluating a plurality of images originating from multiple different sources and for selecting specific images from said plurality in order to generate an overlaid image, said method comprising:
   obtaining a first set of system camera images from a system camera, wherein the system camera operates at a first frame per second (FPS) rate;
   obtaining a second set of external camera images from an external camera that is detached from the system camera, wherein the external camera operates at a second FPS rate that is different from the first FPS rate;

accessing a set of rules that govern a selection process for selecting, from among the first set of system camera images, a specific system camera image and for selecting, from among the second set of external camera images, a specific external camera image, the selected specific system camera image and the specific external camera image being designated for use in generating an overlaid image;

performing the selection process using the accessed set of rules, wherein performance of the selection process results in the specific system camera image and the specific external camera image being selected;

generating the overlaid image by overlaying and aligning content obtained from the selected external camera image onto the selected system camera image; and displaying the overlaid image in a head mounted device (HMD).

12. The method of claim 11, wherein the first FPS rate is at least 60 FPS, and the second FPS rate is at least 30 FPS, and the selection process is performed at about 3 Hz.

13. The method of claim 11, wherein the set of rules is dependent on a motion blur detected for each image in the first set of system camera images and in the second set of system camera images.

14. The method of claim 11, wherein the set of rules is dependent on a detected number of feature points detected for each image in the first set of system camera images and in the second set of system camera images.

15. The method of claim 11, wherein the set of rules is dependent on a noise level detected for each image in the first set of system camera images and in the second set of system camera images.

16. The method of claim 11, wherein the set of rules is dependent on a similarity factor detected between at least two images included in the first set of system camera images and in the second set of system camera images, the similarity factor indicating that the at least two images are to be different than previously selected images.

17. The method of claim 11, wherein the set of rules is dependent on an amount of movement that is detected between at least two images included in the first set of system camera images and in the second set of system camera images.

18. A head mounted device (HMD) configured to evaluate a plurality of images originating from multiple different sources and to select specific images from said plurality in order to generate an overlaid image, said HMD comprising:

a system camera;

one or more processors; and one or more computer-readable hardware storage devices that store instructions that are executable by the one or more processors to cause the computer system to:

obtain a first set of system camera images from the system camera, wherein the system camera operates at a first frame per second (FPS) rate;

obtain a second set of external camera images from an external camera that is detached from the system camera, wherein the external camera operates at a second FPS rate that is different from the first FPS rate;

access a set of rules that govern a selection process for selecting, from among the first set of system camera images, a specific system camera image and for selecting, from among the second set of external camera images, a specific external camera image, the selected specific system camera image and the specific external camera image being designated for use in generating an overlaid image;

perform the selection process using the accessed set of rules, wherein performance of the selection process results in the specific system camera image and the specific external camera image being selected; and generate the overlaid image by overlaying and aligning content obtained from the selected external camera image onto the selected system camera image.

19. The HMD of claim 18, wherein the set of rules is dependent on:

an amount of texture detected for each image in the first set of system camera images and in the second set of system camera images; and a gain setting that was used to generate each image in the first set of system camera images and in the second set of system camera images.

20. The HMD of claim 18, wherein the set of rules is dependent on:

a pose detected for each image in the first set of system camera images and in the second set of system camera images; and a timestamp determined for each image in the first set of system camera images and in the second set of system camera images.

* * * * *